(12) United States Patent
Kern et al.

(10) Patent No.: US 10,868,735 B2
(45) Date of Patent: Dec. 15, 2020

(54) MULTI-DOMAIN ORCHESTRATOR ASSISTED PATH COMPUTATION ENTITY (PCE) ENDPOINT RESOLUTION

(71) Applicant: TELEFONAKTIEBOLAGET LM ERICSSON (PUBL), Stockholm (SE)

(72) Inventors: András Kern, Budapest (HU); Balázs Peter Gerö, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 10 days.

(21) Appl. No.: 16/345,701

(22) PCT Filed: Jan. 23, 2017

(86) PCT No.: PCT/IB2017/050344
§ 371 (c)(1),
(2) Date: Apr. 27, 2019

(87) PCT Pub. No.: WO2018/134647
PCT Pub. Date: Jul. 26, 2018

(65) Prior Publication Data
US 2019/0356559 A1 Nov. 21, 2019

(51) Int. Cl.
*H04L 12/24* (2006.01)
*H04L 12/715* (2013.01)

(52) U.S. Cl.
CPC ........ *H04L 41/5054* (2013.01); *H04L 41/042* (2013.01); *H04L 41/5058* (2013.01); *H04L 45/04* (2013.01)

(58) Field of Classification Search
None
See application file for complete search history.

(56) References Cited

U.S. PATENT DOCUMENTS

| 2014/0161128 | A1 | 6/2014 | Dhody et al. |
| 2017/0070426 | A1* | 3/2017 | Chen ............... H04L 45/44 |
| 2017/0289028 | A1* | 10/2017 | Ratnasingham ..... H04L 41/12 |

OTHER PUBLICATIONS

International Search Report and Written Opinion, dated Nov. 6, 2017, issued in related International Application No. PCT/IB2017/050344.
DGS/NFV-MAN001 (Dec. 2014), Network Functions Virtualisation (NFV); Management and Orchestration, ETSI GS NFV-MAN 001 V.1.1.1, Dec. 2014, Sophia Antipolis, France.
R. Szabo et al., "Recursive Virtualization and Programming for Network and Cloud Resources; draft-itrf-nfvrg-unify-recursive-programming-oo", NFVRG, Mar. 21, 2016, pp. 1-40.
C. Margaria et al., PCEP Extensions for GMPLS; draft-ietf-pce-gmpls-pcep-extensions-11 , IETF Working Group Draft, Oct. 17, 2015, pp. 1-38.

(Continued)

*Primary Examiner* — Saumit Shah

(57) ABSTRACT

A multi-provider network infrastructure is described herein where a Multi-Domain Orchestrator (MDO) is configured to assist a Path Computation Entity (PCE) in resolving a placement and location (identifier) of a tunnel path endpoint for a network service.

11 Claims, 10 Drawing Sheets

(56) References Cited

OTHER PUBLICATIONS

Riccardo Guerzoni et al., "Analysis of end-to-end multi-domain management and orchestration frameworks for software defined infrastructures: an architectural survey", Transactions on Emerging Telecommunications Technologies, vol. 28, No. 4, Sep. 13, 2016, pp. 1-19.

P. Quinn et al., "Network Service Header; draft-ieff-sfc-nsh-02.txt", Internet Engineering Task Force, IETF, Internet Society (ISOC) 4, Rue Des Falaises CH-1205, Geneva, Switzerland, Jan. 19, 2016, pp. 1-43.

Ed JP. Vasseur et al., "RFC 5440—Path Computation Element (PCE) Communication Protocol (PCEP)", IETF, Mar. 31, 2009, pp. 1-174.

Li Guanglei et al., "Hybrid Hierarchical Multi-Domain Service Function Chaining; draft-li-sfc-hhsfc-00.txt", IETF, Internet Society (ISOC) 4, Rue Des Falaises Ch-1205, Geneva, Switzerland, Jun. 11, 2016, pp. 1-12.

Daniele Ceccarelli et al., "Framework for Abstraction and Control of Traffic Engineered Networks; draft-ietf-teas-actn-framework-01", TEAS Working Group, Oct. 25, 2016, pp. 1-28.

\* cited by examiner

MULTI-DOMAIN ORCHESTRATOR ASSISTED PATH COMPUTATION ENTITY (PCE) ENDPOINT RESOLUTION

CLAIM OF PRIORITY

This application is a 371 of International Application No. PCT/IB2017/050344, filed Jan. 23, 2017, 2010. The disclosure of this document is hereby incorporated herein by reference.

TECHNICAL FIELD

The present disclosure relates to a multi-provider network infrastructure in which a Multi-Domain Orchestrator (MDO) assists a Path Computation Entity (PCE) in resolving a placement and location (e.g., identifier) of a tunnel path endpoint for a network service.

BACKGROUND

The following abbreviations are herewith defined, at least some of which are referred to within the following description of the present disclosure.
API Application Programming Interface
BGP-LS Border Gateway Protocol-Link State
BR Border Router
BRPC Backward Recursive Path Computation
DB Database
DC Data Center
ETSI European Telecommunications Standards Institute
GW Gateway
ID Identification
IP Internet Protocol
IRO Include Route Object
MDO Multi-Domain Orchestrator
NFV Network Function Virtualization
PCE Path Computation Element
PCEP Path Computation Element Protocol
PE Provider Edge
QoS Quality of Service
TE Traffic Engineering
TLV Type Length Value
VNF Virtual Network Function
WAN Wide Area Networks Referring to FIG. 1 (PRIOR ART), there is a diagram illustrating an exemplary network infrastructure 100 of multiple operators A, B and C which comprises WANs 102$a$, 102$b_1$, 102$b_2$, 102$c$ and DCs 104$a$, 104$c$. Each DC 104$a$ and 104$c$ typically has multiple blade servers 106$a$ and 106$c$ (only one shown per each DC herein). Plus, DC 104$a$ has pair of GWs 108$a_1$ and 108$a_2$ respectively connected to BRs 110$a_1$ and 110$a_2$ of WAN 102$a$. DC 104$c$ has pair of GWs 108$c_1$ and 108$c_2$ respectively connected to BRs 110$c_1$ and 110$c_2$ of WAN 102$c$. WAN 102$a$ has a pair of BRs 110$a_3$ and 110$a_4$ respectively connected to a pair of BRs 110$b_1$ and 110$b_2$ of WAN 102$b_1$. WANs 102$b_1$ and 102$b_2$ are connected to one another by a pair of BRs 110$b_3$ and 110$b_4$. WAN 102$b_2$ has a pair of BRs 110$b_5$ and 110$b_6$ respectively connected to BRs 110$c_3$ and 110$c_4$ of WAN 102$c$. WAN 102$b_2$ and WAN 102$c$ each have a respective PE node 113$b$ and 113$c$. Further, each WAN 102$a$, 102$b_1$, 102$b_2$, 102$c$ and DC 104$a$ and 104$c$ may comprise additional network nodes, routers, switches etc . . . which are not depicted herein for clarity.

Operators A and B often establish inter-provider data links between the BRs 110$a_3$, 110$a_4$, 110$b_1$, 110$b_2$ of their adjacent WANs 102$a$ and 102$b_1$. Operators B and C often establish inter-provider data links between the BRs 110$b_5$, 110$b_6$, 110$c_3$, 110$c_4$ of their adjacent WANs 102$b_2$ and 102$c$. To eliminate single point of failure issues a pair of inter-provider links with two times two BRs 110$a_3$, 110$a_4$, 110$b_1$, 110$b_2$, 110$b_5$, 110$b_6$, 110$c_3$, 110$c_4$ are typically installed in the network infrastructure 100.

To orchestrate its respective infrastructure network domain A, B and C, each operator A, B and C runs a Multi-Domain Orchestrator 112$a$, 112$b$, and 112$c$ (MDO 112$a$, 112$b$ and 112$c$) that amongst other tasks is in charge of network function placement decisions, resource assignments and deriving necessary network configuration. To instantiate a service that uses resources of more than one operator A, B and C, the MDO 112$a$, 112$b$ and 112$c$ of one operator A, B and C passes one or more network service request(s) to the MDOs 112$a$, 112$b$ and 112$c$ of one or more other operators A, B and C over an orchestration interface 114$a$, 114$b$ and 114$c$. To orchestrate such multi-operator services, the orchestration interface 114$a$, 114$b$ and 114$c$ can be based on the following: (1) the ETSI data model for OS-MA reference point (e.g., see DGS/NFV-MAN001 (2014). Network Functions Virtualization (NFV); Management and Orchestration, ETSI GS NFV-MAN 001 V1.1.1, Sophia Antipolis, France—the contents of which are hereby incorporated herein by reference for all purposes); or (2) on UNIFY (e.g., see R. Szabo et al. (2016), Recursive virtualization and programming for network and cloud resources. https://tools.ietf org/html/draft-irtf-nfvrg-unify-recursive-programming-00—the contents of which are hereby incorporated herein by reference for all purposes).

During the establishment of a service by a service originating operator A spanning over network domains A, B and C, the MDO 112$b$ of the intermediate operator B may conduct a service decomposition and may request a third operator C to implement some part of the service. The MDO 112$c$ of the service implementing domain C may decompose the service and invoke its domain orchestrator 116 to implement the service.

Path Computation Entities 118$a$, 118$b$ and 118$c$ (PCEs 118$a$, 118$b$ and 118$c$) aim at calculating a path between two or more nodes of the network domains A, B and C that will be used when a connection is implemented for the service. To calculate a path that spans over several network domains A, B, C the PCEs 118$a$, 118$b$, 118$c$ corresponding to the network domains A, B, C will cooperate in the calculation of the path and the setup or update of the path. When the cooperating PCEs 118$a$, 118$b$, 118$c$ are in peering relation, they apply a BRPC procedure. The cooperating PCEs 118$a$, 118$b$, 118$c$ can also be in hierarchical relation as well. The PCE 118$a$, 118$b$, 118$c$ can also initiate the setup or update of an existing connection for a service according to the calculated path. During this step, the PCE 118$a$, 118$b$, 118$c$ programs some nodes in the respective managed domain A, B, C using either PCEP or other protocols, such as OpenFlow or device specific APIs.

The network service requires connectivity with given QoS constraints between certain network functions and access points (e.g., attachment circuit). The default connectivity, which is implemented by shortest path routing, may not fulfill service defined QoS constraints. In this case, the MDO 112$a$, 112$b$, 112$c$ can invoke the respective PCE 118$a$, 118$b$, 118$c$ to calculate the path (and optionally to setup a connection along that path) that fulfills the given QoS constraints for the service. The MDO 112$a$, 112$c$, 112$c$ can steer the traffic of the service into the established connection. Note: the established connection can aggregate the traffic of several different services.

The PCE 118a, 118b, 118c in calculating the path needs to know all tunnel endpoints that are implemented by routers (e.g., border routers $110a_1$, $110a_2$, $110a_3$, $110a_4$, $110b_1$, $110b_2$, $110b_3$, $110b_4$, $110b_5$, $110b_6$, $110c_1$, $110c_2$, $110c_3$, $110c_4$ or gateways $108a_1$, $108a_2$, $108c_1$, $108c_2$ depicted in FIG. 1). In case of a multi-provider service, at least one of the routers $108a_1$, $108a_2$, $108c_1$, $108c_2$, $110a_1$, $110a_2$, $110a_3$, $110a_4$, $110b_1$, $110b_2$, $110b_3$, $110b_4$, $110b_5$, $110b_6$, $110c_1$, $110c_2$, $110c_3$, $110c_4$ belong to network domains A, B, C of different operators A, B, C. Therefore, the service originating MDO 112a (for example) must be able to identify the endpoint router $108a_1$, $108a_2$, $108c_1$, $108c_2$, $110a_1$, $110a_2$, $110a_3$, $110a_4$, $110b_1$, $110b_2$, $110b_3$, $110b_4$, $110b_5$, $110b_6$, $110c_1$, $110c_2$, $110c_3$, $110c_4$ in all domains A, B, C regardless of its owner. Consequently, multi-provider path endpoints are limited to the nodes advertised in advance by the owner A, B, C of the nodes.

Foreign operators B and C (for example) may use BGP-LS or similar protocol to advertise an aggregated view of their networking resources. However, the foreign operators B and C (for example) often represents its complex network B and C (for example) with a single domain that comprises abstract nodes representing the border routers $110b_1$, $110b_2$, $110b_5$, $110b_6$, and $110c_3$, $110c_4$ towards other domains and virtual links between them. Alternatively, instead of defining the full mesh of links between the border routers $110b_1$, $110b_2$, $110b_5$, $110b_6$, and $110c_3$, $110c_4$ representing abstract nodes, an additional abstract node can be added that represents all other edge nodes and internal nodes of that domain. The other abstract nodes are connected to this additional abstract node with virtual links. The MDO 112a, 112b, 112c may use those additional abstract nodes when it specifies the path endpoints, which has several consequences as discussed hereinafter.

When an edge node representing abstract node is referred in the path computation request, the PCEs 118b, 118c (for example) of the foreign domain B, C (for example) will deploy the tunnel endpoint at the referred edge node. The tunnel request originating PCE 118a (for example) can also be provided with the physical location (identifier) of the tunnel endpoint regardless it was advertised in BGP-LS. These cases mandate the IP address of the tunnel endpoint in the foreign domains B and C (for example) as an additional manual input.

Further, the PCE 118b, 118c (for example) of the foreign domain C, D (for example) may not be able to determine the associated infrastructure node (e.g., the edge node) from the abstract node and when this happens they will then declare the path request failed. Accordingly, there has been and is a need to overcome these shortcomings and other shortcomings of the prior art. The present disclosure addresses these shortcomings and other shortcomings of the prior art.

SUMMARY

MDOs (e.g., originating MDO, terminating MDO), PCEs (e.g., originating PCE, terminating PCE), and various methods for addressing the shortcomings of the prior art are described in the independent claims. Advantageous embodiments of the MDOs (e.g., originating MDO, terminating MDO), the PCEs (e.g., originating PCE, terminating PCE), and the various methods are further described in the dependent claims.

In one aspect, the present disclosure provides a MDO (e.g., originating MDO) which comprises a processor and a memory that stores processor-executable instructions, wherein the processor interfaces with the memory to execute the processor-executable instructions, whereby the MDO is operable to perform a first transmit operation and a second transmit operation. In the first transmit operation, the MDO transmits, to one or more foreign MDOs, service specifications associated with a network service. In the second transmit operation, the MDO transmits, to an associated PCE, a connection request to at least calculate a path for a tunnel associated with the network service. The connection request includes (1) an endpoint object which includes a service related description but not an identifier of a physical endpoint associated with the network service, and (2) an IRO field which indicates one or more foreign domains through which the tunnel will traverse to the physical endpoint. An advantage of the MDO performing theses operations is that a tunnel terminating operator becomes able to select the most suitable termination router of a service without disclosing it to the service originating operator.

In one aspect, the present disclosure provides a method implemented in a MDO (e.g., originating MDO) where the method comprises a first transmitting step and a second transmitting step. In the first transmitting step, the MDO transmits, to one or more foreign MDOs, service specifications associated with a network service. In the second transmitting step, the MDO transmits, to an associated PCE, a connection request to at least calculate a path for a tunnel associated with the network service. The connection request includes (1) an endpoint object which includes a service related description but not an identifier of a physical endpoint associated with the network service, and (2) an IRO field which indicates one or more foreign domains through which the tunnel will traverse to the physical endpoint. An advantage of the MDO implementing these steps is that a tunnel terminating operator becomes able to select the most suitable termination router of a service without disclosing it to the service originating operator.

In another aspect, the present disclosure provides a PCE (e.g., originating PCE) which comprises a processor and a memory that stores processor-executable instructions, wherein the processor interfaces with the memory to execute the processor-executable instructions, whereby the PCE is operable to perform a receive operation, a determine operation, a construct operation, and a transmit operation. In the receive operation, the PCE receives, from an associated MDO, a connection request to at least calculate a path for a tunnel associated with a network service. The connection request includes (1) an endpoint object which includes a service related description but not an identifier of a physical endpoint of the network service, and (2) an IRO field which indicates one or more foreign domains through which the tunnel will traverse to the physical endpoint. In the determine operation, the PCE determines a next-hop PCE associated with one of the one or more foreign domains. In the construct operation, the PCE constructs a PCEP request which includes the endpoint object and the IRO field associated with the connection request. In the transmit operation, the PCE transmits, to the next-hop PCE, the PCEP request. An advantage of the PCE (originating PCE) performing theses operations is that a tunnel terminating operator becomes able to select the most suitable termination router of a service without disclosing it to the service originating operator.

In another aspect, the present disclosure provides a method implemented in PCE (originating PCE) where the method comprises a receiving step, a determining step, a constructing step, and a transmitting step. In the receiving step, the PCE receives, from an associated MDO, a connection request to at least calculate a path for a tunnel associated with a network service. The connection request includes (1) an endpoint object which includes a service related description but not an identifier of a physical endpoint of the network service, and (2) an IRO field which indicates one or more foreign domains through which the tunnel will traverse to the physical endpoint. In the determining step, the PCE determines a next-hop PCE associated with one of the one or more foreign domains. In the constructing step, the PCE constructs a PCEP request which includes the endpoint object and the IRO field associated with the connection request. In the transmitting step, the PCE transmits, to the next-hop PCE, the PCEP request. An advantage of the PCE (originating PCE) implementing these steps is that a tunnel terminating operator becomes able to select the most suitable termination router of a service without disclosing it to the service originating operator.

In yet another aspect, the present disclosure provides a PCE (terminating PCE) which comprises a processor and a memory that stores processor-executable instructions, wherein the processor interfaces with the memory to execute the processor-executable instructions, whereby the PCE is operable to perform a receive operation, a check operation, a read operation, a first determine operation, a second determine operation, a formulate operation, and a send operation. In the receive operation, the PCE receives, from a foreign PCE, a PCEP request to at least calculate a path for a tunnel associated with a network service. The PCEP request includes (1) an endpoint object which includes a service related description but not an identifier of a physical endpoint of the network service, and (2) an IRO field which indicates one or more domains through which the tunnel will traverse to the physical endpoint. In the check operation, the PCE checks the PCEP request to determine whether a destination for the tunnel associated with the network service is encoded in a form of the service related descriptor. Based on the determination that the destination for the tunnel associated with the network service is encoded in a form of the service related descriptor, the PCE per the read operation reads the IRO field and then per the first determine operation determines whether all of the one or more domains are under control of an associated MDO. Based on the determination that all of the one or more domains are not under control of the associated MDO, the PCE per the second determine operation determines a next-hop PCE associated with one of the one or more domains, then per the formulate operation formulates a subsequent PCEP request (which includes the endpoint object and the IRO field) to at least calculate the path for the tunnel associated with the network service, and then per the send operation sends the subsequent PCEP request to the next-hop PCE. An advantage of the PCE (terminating PCE) performing theses operations is that a tunnel terminating operator becomes able to select the most suitable termination router of a service without disclosing it to the service originating operator.

In yet another aspect, the present disclosure provides a method implemented in a PCE (terminating PCE) where the method comprises receiving step, a checking step, a reading step, a first determining step, a second determining step, a formulating step, and a sending step. In the receiving step, the PCE receives, from a foreign PCE, a PCEP request to at least calculate a path for a tunnel associated with a network service. The PCEP request includes (1) an endpoint object which includes a service related description but not an identifier of a physical endpoint of the network service, and (2) an IRO field which indicates one or more domains through which the tunnel will traverse to the physical endpoint. In the checking step, the PCE checks the PCEP request to determine whether a destination for the tunnel associated with the network service is encoded in a form of the service related descriptor. Based on the determination that the destination for the tunnel associated with the network service is encoded in a form of the service related descriptor, the PCE per the reading step reads the IRO field and then per the first determining step determines whether all of the one or more domains are under control of an associated MDO. Based on the determination that all of the one or more domains are not under control of the associated MDO, the PCE per the second determining step determines a next-hop PCE associated with one of the one or more domains, then per the formulating step formulates a subsequent PCEP request (which includes the endpoint object and the IRO field) to at least calculate the path for the tunnel associated with the network service, and then per the sending step sends the subsequent PCEP request to the next-hop PCE. An advantage of the PCE (terminating PCE) implementing these steps is that a tunnel terminating operator becomes able to select the most suitable termination router of a service without disclosing it to the service originating operator.

In still yet another aspect, the present disclosure provides a MDO (terminating MDO) which comprises a processor and a memory that stores processor-executable instructions, wherein the processor interfaces with the memory to execute the processor-executable instructions, whereby the MDO is operable to perform a receive operation, a read operation, a look-up operation, a check operation, a determine operation, a construct-transmit operation, and an update operation. In the receive operation, the MDO receives, from an associated PCE, an endpoint resolution request. The endpoint resolution request includes (1) an endpoint object which includes a service related description but not an identifier of a physical endpoint of a network service, and (2) an IRO field which indicates on one or more domains through which a tunnel will traverse to the physical endpoint. In the read operation, the MDO reads the service related descriptor from the endpoint object of the endpoint resolution request. In the look-up operation, the MDO looks-up a service instance that contains a service element referred to by the service related descriptor. In the check operation, the MDO checks whether there is a service that contains the service element referred by the service related descriptor. Based on the determination that there is the service that contains the service element referred by the service related descriptor, the MDP per the determine operation determines an endpoint identifier or another service related descriptor where the physical endpoint resides, per the construct-transmit operation constructs an endpoint resolution reply including the determined endpoint identifier or another service related descriptor and transmits the endpoint resolution reply to the PCE, and then per the update operation updates a service instance configuration to use the tunnel to the physical endpoint. An advantage of the MDO (terminating MDO) performing theses operations is that a tunnel terminating operator becomes able to select the most suitable termination router of a service without disclosing it to the service originating operator.

In still yet another aspect, the present disclosure provides a method implemented in a MDO (terminating MDO) where the method comprises a receiving step, a reading step, a looking-up step, a checking step, a determining step, a constructing-transmitting step, and an updating step. In the receiving step, the MDO receives, from an associated PCE, an endpoint resolution request. The endpoint resolution request includes (1) an endpoint object which includes a service related description but not an identifier of a physical endpoint of a network service, and (2) an IRO field which indicates on one or more domains through which a tunnel will traverse to the physical endpoint. In the reading step, the MDO reads the service related descriptor from the endpoint object of the endpoint resolution request. In the looking-up step, the MDO looks-up a service instance that contains a service element referred to by the service related descriptor. In the checking step, the MDO checks whether there is a service that contains the service element referred by the service related descriptor. Based on the determination that there is the service that contains the service element referred by the service related descriptor, the MDP per the determining step determines an endpoint identifier or another service related descriptor where the physical endpoint resides, per the constructing-transmitting step constructs an endpoint resolution reply including the determined endpoint identifier or another service related descriptor and transmits the endpoint resolution reply to the PCE, and then per the updating step updates a service instance configuration to use the tunnel to the physical endpoint. An advantage of the MDO (terminating MDO) implementing these steps is that a tunnel terminating operator becomes able to select the most suitable termination router of a service without disclosing it to the service originating operator.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings.

DETAILED DESCRIPTION

Figure 1:
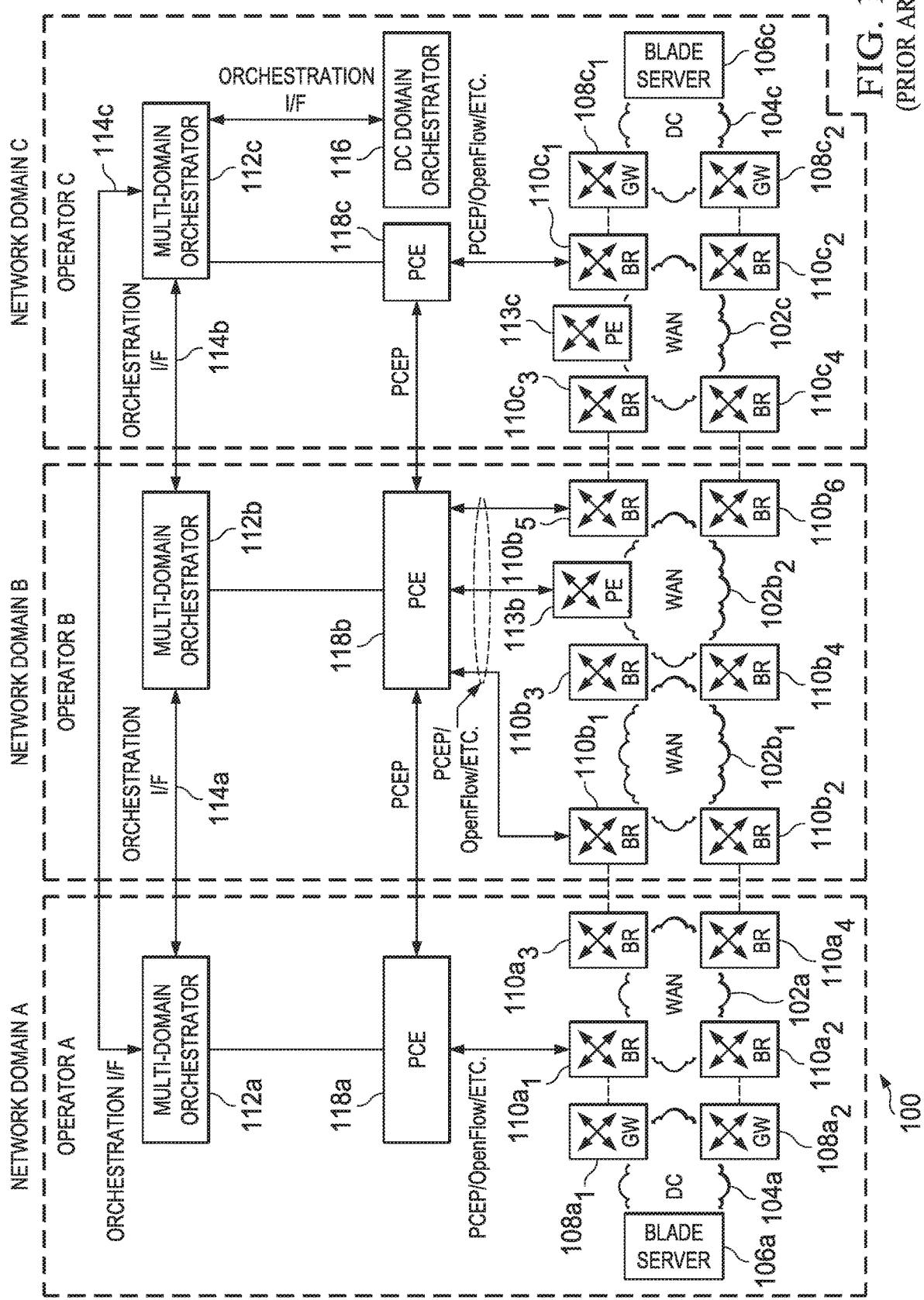
FIG. 1 (PRIOR ART) is a diagram illustrating a traditional multi-operator network infrastructure.

A discussion is provided herein first to disclose some basic features of the present disclosure. Then, a discussion is provided to disclose more detailed features of various embodiments of the present disclosure (see FIGS. 2-5). Thereafter, a discussion is provided to explain the functionalities-configurations of an originating MDO, an originating PCE, a terminating MDO, and a terminating PCE in accordance with different embodiments of the present disclosure (see FIGS. 6-11).

A basic feature of the present disclosure is for an originating MDO in the originating domain to use a service related descriptor (network service object, network service element) to characterize a path tunnel endpoint that is not bound to resources in advance in a connection request which is sent to an originating PCE in the originating domain. For example, the service related descriptor (network service object, network service element) can be an identifier of a connection point object utilizing ETSI NFV/MANO data models. The placement and location (identifier) decision of the tunnel endpoint is performed by the receiver domain (e.g., the terminating PCE and the terminating MDO) at the time when a path computation request arrives from the originating PCE. To guide the location (identifier) decision by the terminating MDO, the originating MDO in a separate communication over an orchestration interface with the terminating MDO provides information about how the service related descriptor (network service object) refers to an element of service specifications (tunnel endpoint) to the terminating MDO. The basic features of the present disclosure are as follows:

A first MDO that originates the network service orchestration request triggers a first PCE to calculate a path toward a tunnel endpoint that is defined with a reference to a network service related descriptor (for example a connection point) without knowing the exact location (identifier) of the network service object. Note: only the operator that is in charge of placing the service object knows the location (identifier) of the tunnel endpoint.

After receiving a path computation request from the first PCE where the path computation request has the network service related descriptor that characterizes a tunnel endpoint, a second PCE interacts with a second MDO that is involved in implementing the particular network service to resolve the tunnel endpoint.

The second MDO responds to the second PCE with (1) the identifier of the physical node that implements the tunnel endpoint (e.g., see first scenario described below), (2) with a second service related descriptor as path tunnel endpoint together with a targeted domain identifier (e.g., see second scenario described below), or (3) with a failure notification. When the second MDO responds with a second service related descriptor the second PCE sends a subsequent request to a third PCE that calculates the path over a set of domains towards the service endpoint referred by the second service related descriptor. Otherwise, when the second MDO responds with the identifier of the physical node that implements the tunnel endpoint (physical location) then the second PCE continues according to the state-of-the-art and uses the physical location (identifier) to calculate the path for the service. And, when the second MDO responds with a failure notification then the second PCE continues according to the state-of-the-art and considers the path computation to have failed.

The second PCE (or third PCE) in its path computation reply to the first PCE may report back the selected physical tunnel endpoint by rewriting the connection point reference to an identifier of the physical node that implements the tunnel endpoint (physical location).

The following is a more detailed discussion about the features of the various embodiments of the present disclosure.

Figure 2A:
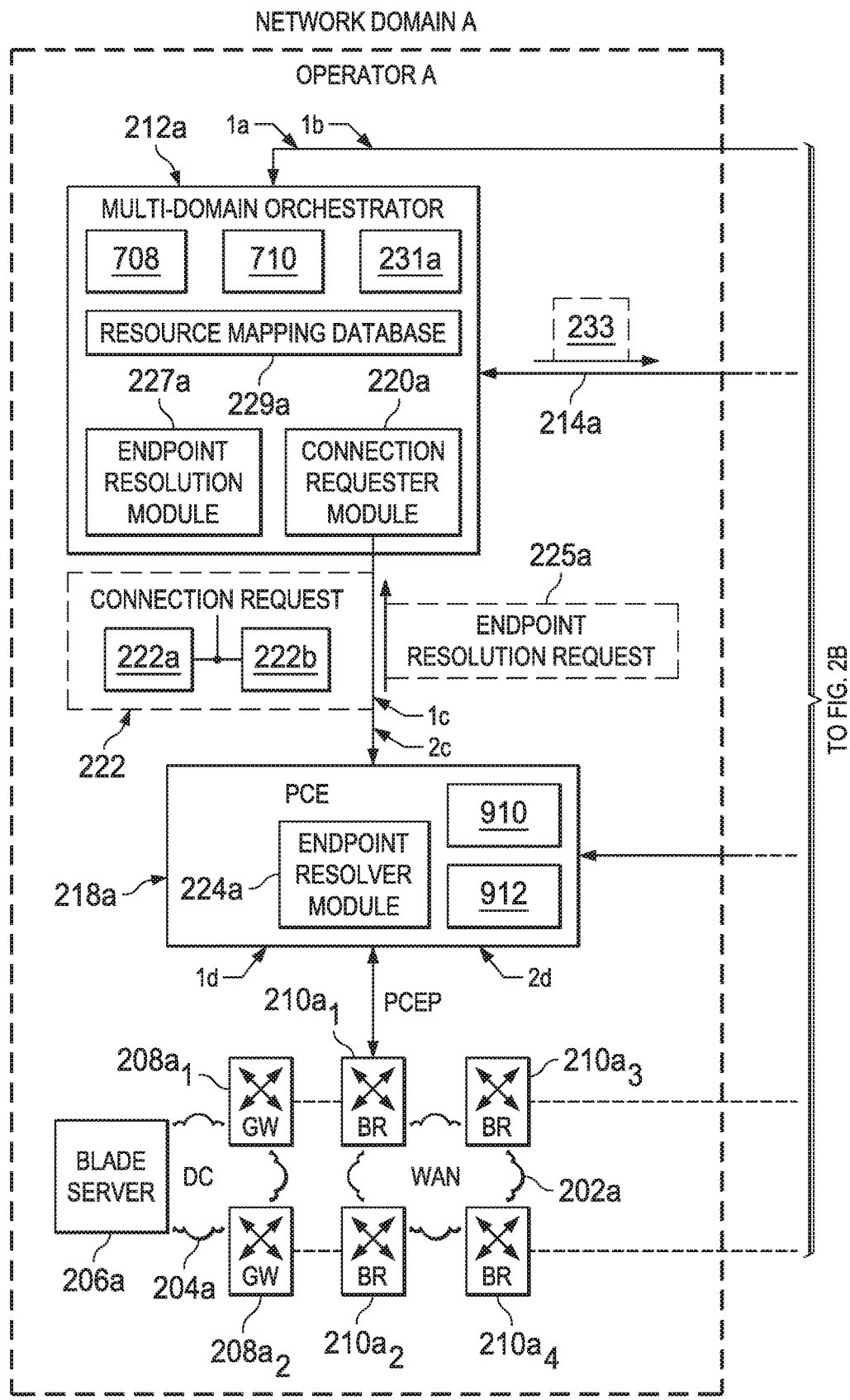
FIG. 2 is a diagram illustrating a multi-operator network infrastructure configured in accordance with an embodiment of the present disclosure.
Figure 2B:
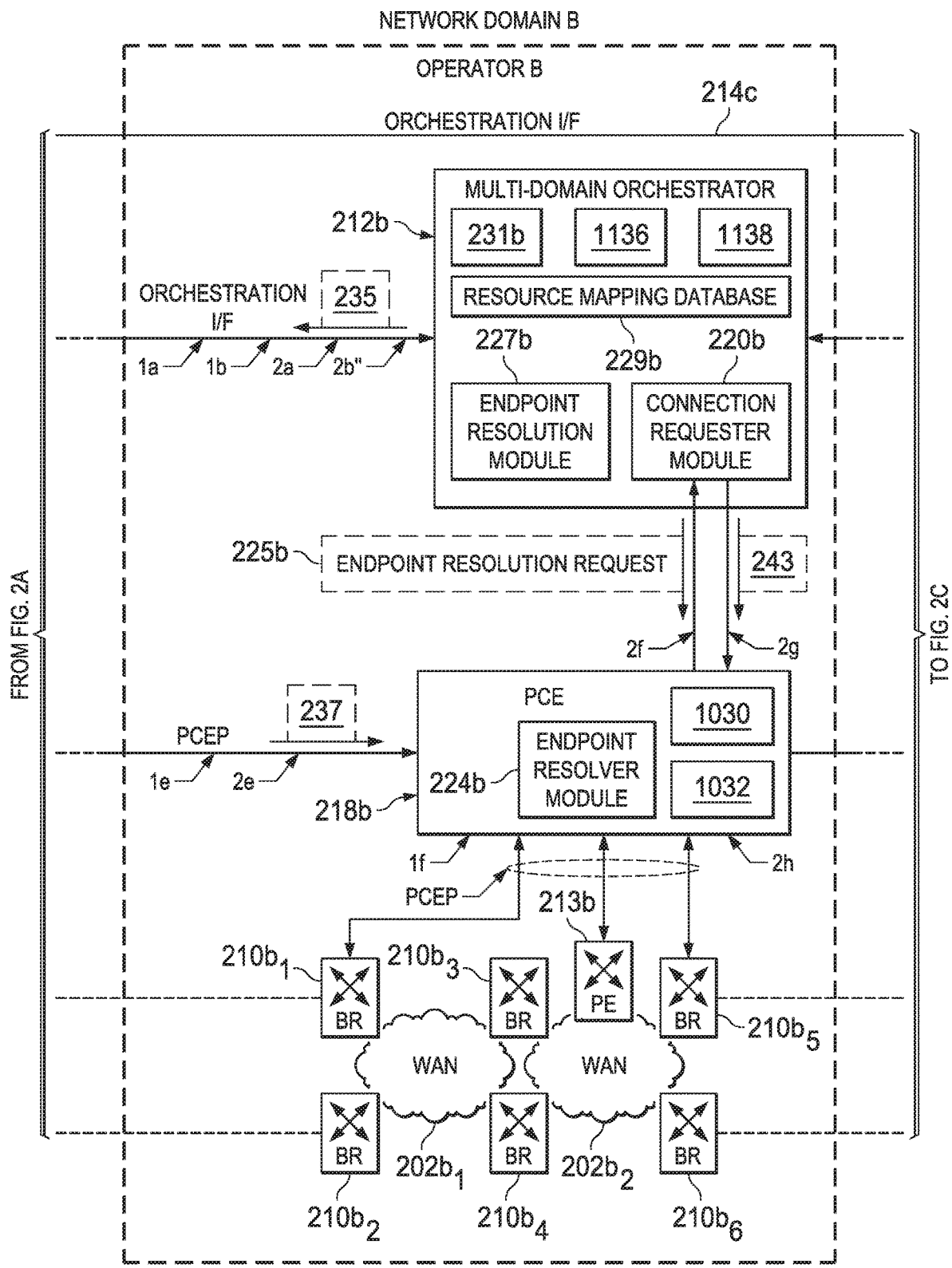
Figure 2C:
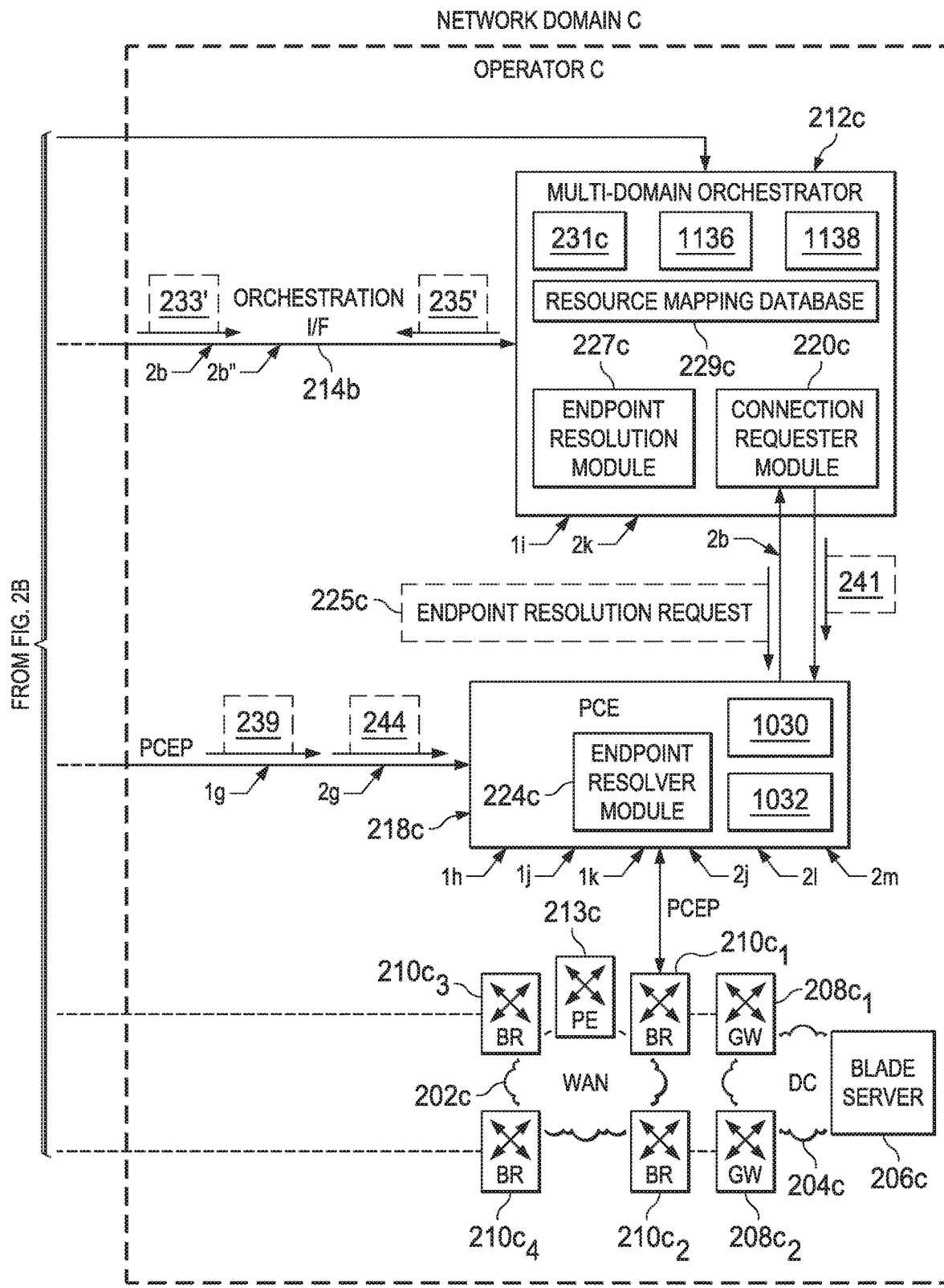

Referring to FIG. 2, there is a diagram illustrating an exemplary network infrastructure 200 of multiple operators A, B and C (for example) in accordance with an embodiment of the present disclosure. The multiple operators A, B and C have WANs 202a, 202$b_1$, 202$b_2$, 202c and DCs 204a and 204c as shown. Each DC 204a and 204c typically has multiple blade servers 206a and 206c (only one shown per each DC herein). Plus, DC 204a has pair of GWs 208$a_1$ and 208$a_2$ respectively connected to BRs 210$a_1$ and 210$a_2$ of WAN 202a. DC 204c has pair of GWs 208$c_1$ and 208$c_2$ respectively connected to BRs 210$c_1$ and 210$c_2$ of WAN 202c. WAN 202a has a pair of BRs 210$a_3$ and 210$a_4$ respectively connected to a pair of BRs 210$b_1$ and 210$b_2$ of WAN 202$b_1$. WANs 202$b_1$ and 202$b_2$ are connected to one another by a pair of BRs 210$b_3$ and 210$b_4$. WAN 202$b_2$ has a pair of BRs 210$b_5$ and 210$b_6$ respectively connected to BRs 210$c_3$ and 210$c_4$ of WAN 202c. WAN 202$b_2$ and WAN 202c each have a respective PE node 213b and 213c. Each operator A, B and C runs a MDO 212a, 212b, and 212c that amongst other tasks described herein is in charge of network function placement decisions, resource assignments and deriving necessary network configuration. The MDOs 212a, 212b and 212c communicate with one another over orchestration interfaces 214a, 214b and 214c. Each operator A, B and C has a PCE 218a, 218b and 218c which determines as described herein a path between two or more nodes of the network domains A, B and C that will be used when a connection is implemented for the service. Basically, the MDOs 212a, 212b, 212c and PCEs 218a, 218b, 218c described herein are specially configured to solve the aforementioned shortcomings of the prior art in accordance with the present disclosure.

Each MDO 212a, 212b, 212c implements a connection requester module 220a, 220b, 220c that requests the corresponding PCE 218a, 218b, 218c to calculate and optionally request the PCE 218a, 218b, 218c to instantiate a path between two or more endpoints (e.g., see connection request 222 shown in FIG. 2) residing at network domains A, B, C belonging to different operators A, B, C. To describe a tunnel endpoint residing in domains B, C (for example) of other operators B, C (for example), the MDO 212a (for example) includes in the connection request 222 sent to the PCE 218a a network service related descriptor (network service object, network service element) that is not bound to networking resources in advance. Such a network service related descriptor relates to one or several objects of a network service specification 233 that the MDO 212a (for example) communicated to several other MDOs 212b, 212c (for example) over the orchestration interface 214a, 214c (for example). Note: the MDO 212a (for example) may include within the network service specification 233 that is sent over the orchestration interface 214a, 214c the network service specification infrastructure network elements (e.g., a blade server 206c, a gateway 208$c_1$, 208$c_2$, a border router 210$b_1$, 210$b_2$, 210$b_3$, 210$b_4$, 210$b_5$, 210$b_6$, 210$c_1$, 210$c_2$, 210$c_3$, 210$c_4$ and a PE node 213b, 213c) of the remote domains B, C when it knows them. The implementation of the network element can be a physical device as well as several software components running on e.g., general purpose hardware.

Each PCE 218a, 218b, 218c that is responsible for path calculation of an operator network A, B, C implements an endpoint resolver module 224a, 224b, 224c that sends an endpoint resolution request 225a, 225b, 225c to the corresponding MDO 212a, 212b, 212c to resolve the above network service related descriptor to an infrastructure network element (see first scenario described below) or to a second service related descriptor (see second scenario described below).

Each MDO 212a, 212b, 212c also implements an endpoint resolution module 227a, 227b, 227c that processes the endpoint resolution requests 225a, 225b, 225c emitted by the corresponding PCE 218a, 218b, 218c. During the resolution procedure, the endpoint resolution module 227a, 227b, 227c can use a resource mapping database 229a, 229b, 229c which contains information about the association of the network service related descriptor (network service object) to a identifier (location) of tunnel endpoint (element of service specification). The endpoint resolution module 227a, 227b, 227c can also use a policy database 231a, 231b, 231c to obtain the policies that influences the procedure conducted by the endpoint resolution module 227a, 227b, 227c.

An exemplary process per a first scenario is described next where operator A wants to establish a network service with operator C where the process will need to involve operator B as well otherwise it would not be possible to implement the connection between the service elements residing in e.g., the data centers 206a and 206c of the operators A and C. The exemplary process of the first scenario has the following steps:

1. The MDO 212a sends service specifications 233 (optionally with a request to start a network service, e.g., network service instantiation request 233) over the orchestration interfaces 114a, 114c to MDOs 212b and 212c (see FIG. 2's step 1a—note the MDO 212a sends different service specifications 233 to MDOs 212b and 212c). The service specifications 233 sent to MDOs 212b and 212c are generated from the end-to-end network service specification determined by operator A (i.e., MDO 212a). For example, the service specification 233 can comprise Virtual Machines or other Networking Functions and the expected connectivity between them. The operator A establishes the traffic engineered connections (tunnels) to implement the expected connectivity between the VMs or NFs of the service specification. To setup the traffic engineered connections (tunnels), the MDO 212a involves the PCE 218a, 218b, 218c as described in detail hereinafter.

2. The MDOs 212b, 212c each respond with a receipt 235 to the received service specification 233 (see FIG. 2's step 1b). The receipt 235 indicates that the particular MDO 212b, 212c received and processed the service specification 233 but did not necessarily start instantiating the network service.

3. The MDO 212a after receiving the receipts 235 from the MDOs 212b, 212c sends a connection request 222 to its corresponding PCE 218a to establish a tunnel (connection) with relation to the network service instance 233 (service specification 233). The connection request 222 includes an endpoint object 222a that refers to the service element (service related description) and an IRO field 222b that indicates the tunnel shall go through operator B and operator C (see FIG. 2's step 1c—this step is also described in more detail below with respect to the section labeled "Encoding the Service Related Descriptor" and the section labeled "Multi-Domain Orchestrator procedures for constructing Connection request 222").
4. The PCE 218a processes the connection request 222 and starts the path calculation/instantiation procedure (see FIG. 2's step 1d—this step is described in more detail below with respect to the section labeled "PCE procedures for processing Connection request 222").
5. The PCE 218a sends a PCEP request 237 to PCE 218b (see FIG. 2's step 1e).
6. The PCE 218b processes the PCEP request 237 and determines that the path shall continue through operator C, because operator C is part of the IRO field 222b (see FIG. 2's step 1f—this step is described in more detail below with respect to the section labeled "PCE procedures for processing PCEP request" (see also FIG. 3's step 305 where PCE 218b does not consult with MDO 212b).
7. PCE 218b creates a new PCEP request 239 based on the received PCEP request 237 and sends the new PCEP request 239 to PCE 218c (see FIG. 2's step 1g—this step is described in more detail below with respect to the section labeled "PCE procedures for processing PCEP request"). As part of constructing the new PCEP request 239, the PCE 218b changes the IRO object 222, More specifically, the PCE 218b during this step generates a new IRO object based on the received one where the PCE 218b deletes descriptors of several domains, may substitute a domain with several other domains, etc.
8. PCE 218c determines that the tunnel shall be terminated at a network domain C that is under its control, because operator C is part of the IRO field 222b in the new PCEP request 239. However, the endpoint object 222b carries a service descriptor not a physical endpoint. Therefore, the PCE 218c sends the endpoint resolution message 225c (which includes the endpoint object 222a and the updated IRO field 222 to MDO 212c (see FIG. 2's step 1h—note the PCE 218b updates the IRO field 222b. For example, the PCE 218b can delete the IRO descriptors referring to objects in domains 202a and 202b).
9. MDO 212c sends an endpoint resolution reply 241 with a physical endpoint identifier and IRO field elements (see FIG. 2's step 1i—this step is described in more detail below with respect to the section labeled "MDO procedures for processing Endpoint Resolution Requests").
10. PCE 218c updates its endpoint object 222a and updated IRO field 222 according to the endpoint resolution reply 241 (see FIG. 2's step 1j).
11. PCE 218c finalizes the path calculation to the physical endpoint and responds to PCE 218b which in turn responds to PCE 218a (see FIG. 2's step 1k). Thereafter, PCE 218a performs according to legacy procedures to determine the end-to-end path and optionally to establish the connection along the end-to-end path.

Note: the MDO 212a delays sending the connection request 222 (path calculation request and possibly instantiation request) until it receives the receipts 235 of the network service instantiation request 233. Otherwise, it may be possible that the path computation/instantiation request 237, 239 arrives at the foreign PCEs 218b, 218c before the corresponding MDOs 212b, 212c received the network service instantiation request 233. According to one embodiment, the MDO 212c will not able to resolve the endpoint resolution request 225c and the corresponding PCE 218c will refuse the new PCEP request 239. However, the third scenario described below provides a procedure for the MDO 212c to resolve the endpoint resolution request 225c when the originating MDO 212a has not yet sent the network service instantiation request 233 to the terminating MDO 212c.

An exemplary process per a second scenario is described next where operator A requests a network service from operator B and operator B on its own without operator A's input requests operator C to implement the network service (or some part of the network service). In this case, operator A will think that the tunnel shall be terminated at operator B though it should be terminated at operator C. The exemplary process of the second scenario has the following steps:
1. The MDO 212a sends a service specification 233 (optionally with a request to start a network service, e.g., network service instantiation request 233) over the orchestration interface 214a to MDO 212b (see FIG. 2's step 2a). The service specification 233 sent to MDO 212b is generated from the end-to-end network service specification determined by operator A (i.e., MDO 212a). For example, the service specification 233 can comprise Virtual Machines or other Networking Functions and the expected connectivity between them. The operator A establishes the traffic engineered connections (tunnels) to implement the expected connectivity between the VMs or NFs of the service specification. To setup the traffic engineered connections (tunnels), the MDO 212a involves the PCE 218a, 218b, 218c as described hereinafter.
2. The MDO 212b after receiving the service specification 233 sends a service specification 233' to MDO 212c (see FIG. 2's step 2b). The service specification 233' sent to MDO 212c is generated from the service specification 233. The MDO 212c responds by sending a receipt 235' to MDO 212b indicating that MDO 212c received the service specification 233' (see FIG. 2's step 2b'). The receipt 235' indicates that the particular MDO 212c received and processed the service specification 233' but did not necessarily start instantiating the network service. The MDO 212b after receiving the receipt 235' also responds by sending a receipt 235 to MDO 212a indicating the MDO 212b received service specification 233 (see FIG. 2's step 2b"). The receipt 235 indicates that the particular MDO 212b received and processed the service specification 233 but did not necessarily start instantiating the network service.
3. The MDO 212a after receiving the receipt 235 from the MDO 212b sends a connection request 222 to its corresponding PCE 218a to establish a tunnel with relation to the network service instance 233 (service specifications). The connection request 222 includes an endpoint object 222a that refers to the service element (service related descriptor) and an IRO field 222b that indicates the tunnel shall go through operator B (see FIG. 2's step 2c—this step is also described in more detail below with respect to the section labeled "Encoding the Service Related Descriptor" and the section labeled "Multi-Domain Orchestrator procedures for constructing Connection request 222").

4. The PCE 218*a* processes the connection request 222 and starts the path calculation/instantiation procedure (see FIG. 2's step 2*d*—this step is described in more detail below with respect to the section labeled "PCE procedures for processing Connection request 222").

5. The PCE 218*a* sends a PCEP request 237 to PCE 218*b* (see FIG. 2's step 2*e*).

6. The PCE 218*b* processes the PCEP request 237's IRO field 222*b* and determines that the tunnel shall be terminated at network domain B that is under its control. But the endpoint object 222*a* carries a service descriptor not a physical endpoint. Therefore, PCE 218*b* sends the endpoint resolution message 225*b* (which includes the endpoint object 222*a* and the IRO field 222*b*) to MDO 212*b* (see FIG. 2's step 2*f*).

7. MDO 212*b* is aware of that the tunnel shall be terminated at operator C, but it does not know the physical endpoint identifier. Therefore, MDO 212*b* sends an endpoint resolution reply 243 with an endpoint object that refers to a service element (service related description) and an IRO field that indicates the tunnel shall go to operator C (see FIG. 2's step 2*g*—this step is described in more detail below with respect to the section labeled "MDO procedures for processing Endpoint Resolution Requests"). Note: the service element is associated with the connection request 222 not part of the service specification 233 and 233'.

8. The PCE 218*b* processes the endpoint resolution reply 243 and determines that the path shall continue through operator C, because operator C is part of the IRO field in the endpoint resolution reply 243 (see FIG. 2's step 2*h*—this step is described in more detail below with respect to the section labeled "PCE procedures for processing PCEP request").

9. PCE 218*b* creates a new PCEP request 244 based on the received endpoint resolution reply 243 and sends the new PCEP request 244 to PCE 218*c* (see FIG. 2's step 2*i*).

10. PCE 218*c* determines that the tunnel shall be terminated at a network domain C that is under its control, because operator C is part of the IRO field 222*b* in the new PCEP request 244. However, the endpoint object 222*b* carries a service descriptor not a physical endpoint. Therefore, the PCE 218*c* sends the endpoint resolution message 225*c* to MDO 212*c* (see FIG. 2's step 2*j*).

11. MDO 212*c* sends an endpoint resolution reply 241 with a physical endpoint identifier and IRO field elements (see FIG. 2's step 2*k*—this step is described in more detail below with respect to the section labeled "MDO procedures for processing Endpoint Resolution Requests").

12. PCE 218*c* updates its endpoint object 222*a* and IRO field 222*b* according to the endpoint resolution reply 241 (see FIG. 2's step 2*l*).

13. PCE 218*c* finalizes the path calculation to the physical endpoint and responds to PCE 218*b* which in turn responds to PCE 218*a* (see FIG. 2's step 2*m*). Thereafter, PCE 218*a* performs according to legacy procedures to determine the end-to-end path and optionally to establish the connection along the end-to-end path.

Figure 3:
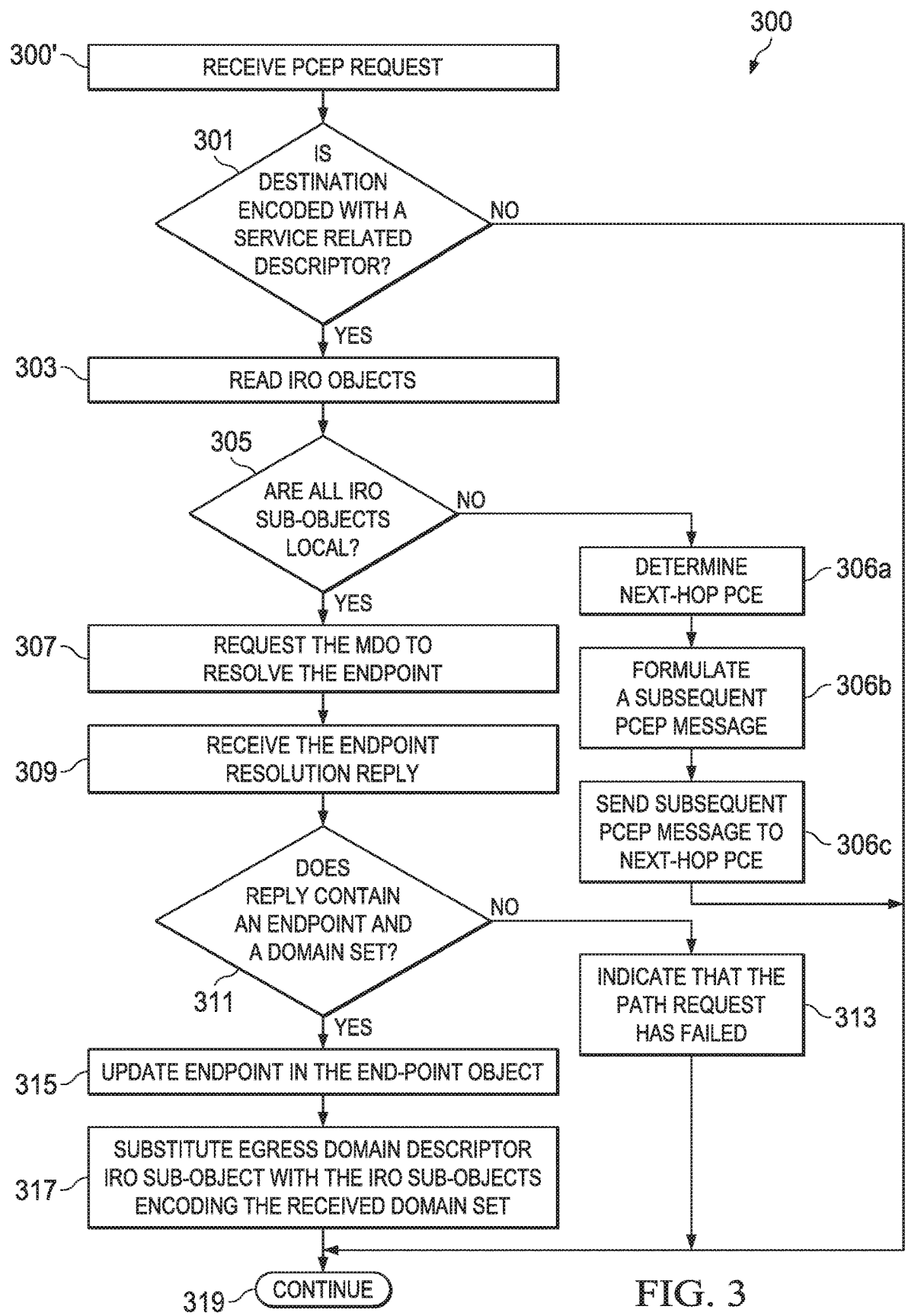
FIG. 3 is a flowchart of a method implemented in a PCE for processing a PCEP request in accordance with an embodiment of the present disclosure.

Another exemplary process per a third scenario is described next where the order of the two phases namely the receipt of the service specifications 233 by MDOs 212*b*, 212*c* (e.g., see FIG. 2's steps 1*a* and 2*b*) and the receipt of the PCEP request 237, 239, 244 by PCE 218*b*, 218*c* (e.g., see FIG. 2's steps 1*h*/1*j* and 2*j*/2*k*) are switched from the viewpoint of a specific operator B, C. For example with reference to the first scenario, assume the PCE 218*c* of operator C receives the PCEP request 239 before the MDO 212*c* of operator C received the corresponding service specification 333. In this case, the PCE 218*c* will send the endpoint resolution message 225*c* to MDO 212*c* to request the MDO 212*c* to resolve the service content of the PCEP endpoint object 222*a* however the MDO 212*c* lacks the necessary information, i.e., the service specification 333 to resolve the service content. In this situation, the MDO 212*c* can perform as follows:

a) The MDO 212*c* may return a resolution failure (see FIG. 4's step 423) and the PCE 212*c* indicates that the path request has failed to the originating PCE 212*a* (see FIG. 3's step 313).

b) The MDO 212*c* may decide to wait to receive the missing service specification 333. However, the MDO 212*c* should not block the PCEP protocol. Therefore, the MDO 212*c* can select a "intermediate node" (e.g., an border router 210$c_3$ or 210$c_4$—temporal network node) of its domain C where the tunnel (connection) can be "temporary" terminated. The MDO 212*c* reports this intermediate node in its endpoint resolution response 241 to the PCEP 218*c* (see FIG. 4's steps 419 and 421). As a result a tunnel (path) to the "intermediate node" (e.g., border router 210$c_3$ or 210$c_4$) will be created (note: the border router 210$c_3$ or 210$c_4$ is just an example of a "intermediate node" where the MDO 212*c* would select it because the optimal route of the final tunnel may go through that node). Thereafter, when the service specification 333 arrives the MDO 212*c* can find out the "final endpoint" network node. Then, the MDO 212*c* can request the PCE 218*c* to create a path between the intermediate node and the endpoint network node and the MDO 212 configures the intermediate node to connect the two paths together (see FIG. 5). For this purpose, the MDO 212*c* sends a connection request 222 to PCE 218*c* that comprises of an endpoint object 222*a*. The endpoint object 222*a* carries an identifier of the "intermediate node" as well as an identifier of the endpoint network node.

The following is a detailed discussion about the various features briefly mentioned above with respect to the first, second and third scenarios of the present disclosure.

Encoding the Service Related Descriptor

As discussed above, the endpoint(s) of a path request (e.g., connection request 222, PCEP request 237, 239, 244) are specified using service related descriptor(s). The endpoint(s) will be encoded in the endpoints object 222*a*. To carry the endpoint(s) a new TLV is defined: this TLV indicates that the encoded value (related to the service related descriptor(s)) is a reference to an element of a network service request and also defines the format of the particular reference. Examples of how the service related descriptor can be encoded and used with the new TLV are as follows:

When the network service descriptor is defined using a Network Service Descriptor of ETSI, then the reference can be the identifier of a connection point or a service access point.

When the network service descriptor is described using a UNIFY data model, then the reference will be an XPATH reference to a port object.

Connection Request Operation

The following subsections define exemplary procedures that can be implemented by the MDO 212a, 212b, 212c and the PCE 218a, 218b, 218c to support the connection request operation defined in the present disclosure.

i. Multi-Domain Orchestrator Procedures for Constructing Connection Request 222

To establish a multi-domain connection, the MDO 212a (for example) sends the connection request 222 to its corresponding PCE 218a (for example) to calculate and optionally to establish (instantiate) a connection between two or more endpoints that obeys the defined QoS constraints and the TE goals (e.g., the operation of connection request 222). More specifically, the MDO 212a (for example) transmits the connection request 222 which has the endpoint object 222a which includes service related descriptor(s) as the specification of the endpoint(s) that reside at other operators domains B and/or C. However, the PCE 218a (for example) that receives the connection request 222 is not aware of the identifier (location) of the remote endpoint(s) encoded with the service related descriptor(s) and thus it cannot perform path calculation. To solve this, the MDO 212a (for example) also includes in the connection request 222 the IRO field 222b which includes the identifier of a network domain B or C (for example) belonging to the operator B or C (for example) implementing the remote final endpoint (which is also referred to herein as the egress domain identifier).

Together with the above endpoint object 222a and the IRO field 222b, the MDO 212a (for example) can if desired pass further attributes that the corresponding PCE 218a (for example) as well which the subsequent triggered PCEs 218b, 218c (for example) can take into account during the path computation. Examples of such attributes are QoS constraints, identifier(s) of network domain(s) that the path should use and identifier(s) of network domain(s) that the path must avoid.

ii. PCE Procedures for Processing Connect Request 222

Upon receiving the connection request 222, the PCE 218a (for example) uses the identifier of the egress domain (indicated in the IRO field 222b) during the path calculation instead of the service related descriptor (indicated in the endpoint object 222a). The PCE 218a (for example) may also determine a sequence of domains as a path towards the egress domain (note: in the first scenario this sequence of domains were network domain's A, B and then C). Furthermore, the PCE 218a (for example) determines the next-hop PCE 218b (for example—per first scenario) and encodes the received attributes in the constructed PCEP request 237 (per first scenario) as follows:

The service related descriptor is encoded into a TLV that is inserted into the endpoint object 222a of the PCEP request 237 (e.g., see above section labeled "Encoding the Service Related Descriptor").

The egress domain identifier (for example the domain C per the first scenario) is included into IRO field 222b of the PCEP request 237. When the PCE 218a (for example) expects the IRO as a sequence of strict or loose hops, then egress domain (e.g., domain C per first scenario) is encoded as the last element of the IRO field 222b as a loose hop. The sequence of domain(s) B (for example per first scenario) towards the egress domain C (for example per first scenario) is also included into the IRO object 222b before the egress domain C (for example per first scenario) describing the IRO sub-object.

The PCE 218a (for example) may also receive further attributes (e.g., QoS constraints) in the connection request 222 from MDO 212a. The PCE 218a (for example) handles these attributes according to the existing implementations and encodes them in the subsequence PCEP messages according to the legacy standards.

PCE Procedures for Processing PCEP Requests 237, 239, 244

The PCE 218b, 218c (for example) may receive a PCEP request 237, 239, 244 which carries an endpoint object 222a that encodes at least one service related descriptor (see step 300' in FIG. 3). The PCEP request 237, 239, 244 may refer to a request of calculating one or several paths between a set of endpoints (this type of request, 237, 239, 244 can be referred to as a PCRequest-note PCEP is not considered as a protocol between an MDO 212a, 212b, 212c and its corresponding PCE 218a, 218b, 218c). If desired, the PCEP request 237, 239, 244 can also request the instantiation of the calculated path (the type of request 237, 239, 244 can be referred to as a PCInit message). After receiving the PCEP request 237, 239, 244, the PCE 218b, 218c starts processing the PCEP request 237, 239, 244 by reading the connection destination(s) (e.g., endpoint TLV(s)) specified in the endpoint object 222a. Then, the PCE 218b, 218c can implement the method 300 shown in FIG. 3 for each defined connection destination(s) in accordance with an embodiment of the present disclosure (note: the PCE 218a would also be configured to implement method 300 if it received a PCEP request from PCE 218b, 218c—however this situation is not shown in FIG. 2 nor is it described above with respect to the three exemplary scenarios).

Beginning at step 301, the PCE 218b, 218c checks if the destination to be processed is encoded in a form of a service related descriptor. For example, the PCE 218b, 218c checks if the type value of the endpoint object 222a's TLV(s) specifying the endpoint equals a code point assigned to one of the service related descriptor formats. If the destination is not encoded by a service related descriptor, then the PCE 218b, 218c proceeds to the continuation step 319 where the PCE 218b, 218c continues processing according to the state-of the art.

At steps 303 and 305, the PCE 218b, 218c decides if the service related descriptor is local, i.e., if the service related descriptor refers to a service element that is orchestrated by the MDO 212b, 212c to which the particular PCE 218b, 218c is associated. In particular at step 303, the PCE 218b, 218c reads the IRO field 222b in the received PCEP request 237, 239, 244. Then in step 305, since the PCE 218b, 218c it is not aware of the meaning of the service related descriptor, the PCE 218b, 218c checks if the sub-objects of the IRO field 222b specify only domains or network nodes that are under the control of their respective MDO 212b, 212c. If the result of step 305 is no, the PCE 218b, 218c concludes there are domains or network nodes in the IRO field 222b that are not controlled by its respective MDO 212b, 212c. In this case, the PCE 218b, 218c considers the endpoint belonging to foreign domains or network nodes and as such the endpoint is implemented by the MDO 218b, 218c associated with one of those foreign domains or network nodes. In such a case, the PCE 218b, 218c continues with determining (step 306a) the next-hop PCE based on the IRO, formulating (step 306b) a subsequent PCEP request (including the endpoint object 222a and an updated version of the IRO field 222b), and sending (step 306c) the subsequent PCEP request to that next-hop PCE (e.g., see the above described first scenario where PCE 218b received the PCEP request 237 and then sent the new PCEP request 239 to PCE 218c pursuant to FIG. 3's steps 301, 303, 305, 306a, 306b, and 306c). If the result of step 305 is yes, the PCE 218b, 218c concludes that the tunnel end point is orchestrated by the local MDO 218b, 218c (e.g., see the above described second scenario where PCE 218b received the PCEP request 237 and concludes (albeit not correctly) the MDO 212b orchestrates the tunnel endpoint and will proceed to following step 307). Note: the PCE 218b, 218c would be configured to have information about the set of domains and infrastructure network nodes that are under the control of its MDO 212b, 212c.

If the service related descriptor is considered to be local per step 305, the PCE 218b, 218c at step 307 sends the endpoint resolution request 225b, 225c to the corresponding MDO 212b, 212c to resolve the service related descriptor. If desired, the PCE 218b, 218c can also pass the IRO field 222b or other parts of the PCEP request 239, 244 along with the service related descriptor in the endpoint resolution request 225b, 225c to help with the endpoint resolution performed by the MDO 212b, 212c. The MDO 212b, 212c can respond with an infrastructure node or domain identifier that is suitable for implementing the service element (e.g., see first scenario), with a second service element reference plus a domain identifier (e.g., see second scenario), or with a "no-path" indication. In the first two cases, the MDO 212b, 212c respectively provides the endpoint resolution reply 243, 241 which includes a set of domain(s) and network node(s) to be considered during the path computation.

At step 309, the PCE 218b, 218c receives the endpoint resolution reply 243, 241 from the respective MDO 212b, 212c. In step 311, the PCE 218b, 218c checks if the endpoint resolution reply 243, 241 contains a valid endpoint and the domain set is either empty or defines valid identifiers to domains. The PCE 218b, 218c can conduct these checks using its own topology and resource data base. If the checks of step 311 fail (including the case when the MDO 212b, 212c responded with a "no-path" indication in the endpoint resolution reply 243, 241), the PCE 218b, 218c proceeds to step 313 and considers the path computation request to have failed and sends a reply with an indication of the failure to the requesting PCE 218a. Then, the PCE 218b, 218c proceeds to the continuation step 319 where, the PCE 218b, 218c continues processing according to the state-of the art.

If the checks of step 311 pass, then the PCE 218b, 218c considers the endpoint resolution procedure successful. Then in step 315, the PCE 218b, 218c updates the originally received destination (i.e., the service related descriptor) with the physical endpoint that is provided by the MDO 212b, 212c. The update step includes updating the corresponding endpoint TLV as well. Then in step 317, the PCE 218b, 218c substitutes sub-object in the IRO field 222b that specified the egress domain in the incoming PCEP request 237, 239, 244 with the sequence of IRO sub-objects that describe the domain set in the endpoint resolution reply 241, 243 provided by the MDO 212c, 212b. Thereafter, the PCE 218b, 218c proceeds to the continuation step 319 where the PCE 218b, 218c continues processing according to the state-of the art.

MDO Procedures for Processing Endpoint Resolution Requests, 225b, 225c

Figure 4:
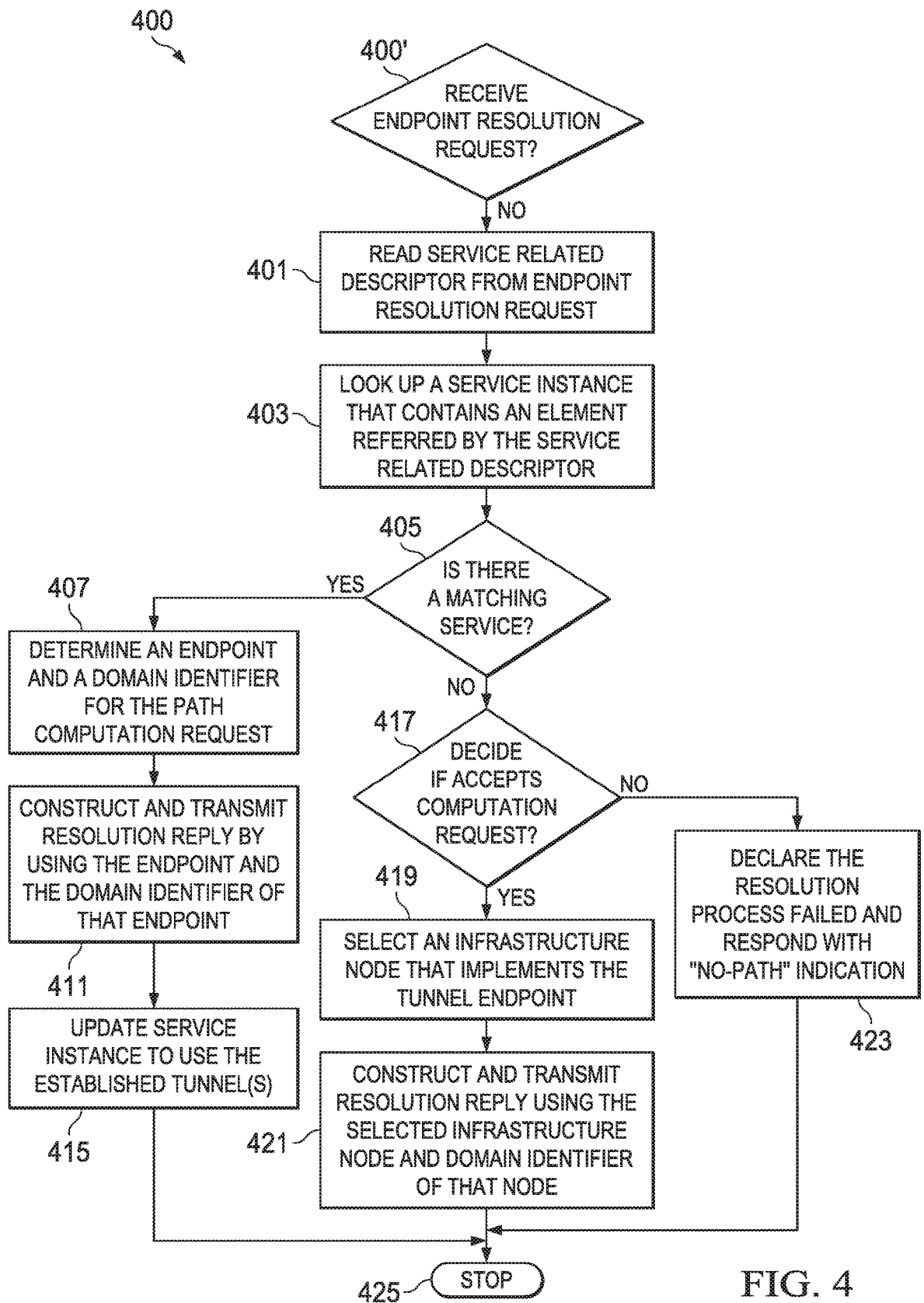
FIG. 4 is a flowchart of a method implemented in a MDO for processing an endpoint resolution request in accordance with an embodiment of the present disclosure.

The MDO 212b, 212c (for example) may receive an endpoint resolution request 225b, 225c from an associated PCE 218b, 218c (see step 400' in FIG. 4). After receiving the endpoint resolution request 225b, 225c, the MDO 212b, 212c may process the endpoint resolution request 225b, 225c by implementing the method 400 depicted in FIG. 4 in accordance with an embodiment of the present disclosure (note: the MDO 212a would also be configured to implement method 400 if it received an endpoint resolution request—however this situation is not shown in FIG. 2 nor is described above with respect to the three exemplary scenarios).

Beginning at step 401, the MDO 212b, 212c reads the endpoint object 222a, which has the encoded service related descriptor, from the received endpoint resolution request 225b, 225c. After that in step 403, the MDO 212b, 212c looks for a previously requested service instance that contains a service element referred by the service related descriptor. For example, when ETSI connection point identifiers are used as the service related descriptor, the MDO 212b, 212c can look for a network service instance that hosts a connection point whose identifier equals to the one encoded in the service related descriptor.

At step 405, the MDO 212b, 212c checks if there is a service that contains the service element referred by the service related descriptor (note: this information would be in the service specifications 233 received from the MDO 212a). If the result of step 405 is yes, in step 407 the MDO 212b, 212c determines an physical endpoint identifier (or a service related description) optionally with a domain identifier where the physical endpoint resides. When the MDO 218b, 218c is able to determine the infrastructure node (physical endpoint) that shall terminate the tunnel, it will encode the IP address of that infrastructure node as the endpoint identifier. If the MDO 212b, 212c cannot deduce the infrastructure node (physical endpoint), for example because it requested a third, remote MDO to implement the service, the MDO 212b, 212c will provide a service related descriptor of the service requested for that third MDO. The MDO 212b, 212c in addition to providing the service related descriptor of the service requested for that third MDO should also provide the domain identifier belonging to the third MDO.

At step 411, the MDO 212b, 212c constructs the endpoint resolution reply 243, 241 in response to the endpoint resolution request 225b, 225c including the determined endpoint and the domain identifier of that physical endpoint node. After constructing the endpoint resolution reply 243, 241, the MDO 212b, 212c sends the endpoint resolution reply 243, 241 to the requesting PCE 218b, 218c.

At step 415, the MDO 212b, 212c updates the service instance configuration to use the tunnel(s) established by the PCEs as a result of the resolution reply to the physical endpoint node. Thereafter, the MDO 212b, 212c proceeds to the stop step 425.

Referring back to step 405, when the MDO 212b, 212c does not find any service that contains elements referred by the original service related descriptor, in step 417 the MDO 212b, 212c decides if it still accepts the path calculation/instantiation request associated with the endpoint resolution request 225b, 225c expecting that the service request 233 (service specification 233) that carries the referred element will be received. When the MDO 212b, 212c decides it does not accept the path calculation/instantiation request it determines to terminate the tunnel request then the MDO 212b, 212c declares the path resolution procedure refused and responds at step 423 to the requesting PCE 212b, 212c with a "no-path" indication. Thereafter, the MDO 212b, 212c proceeds to the stop step 425.

Figure 5:
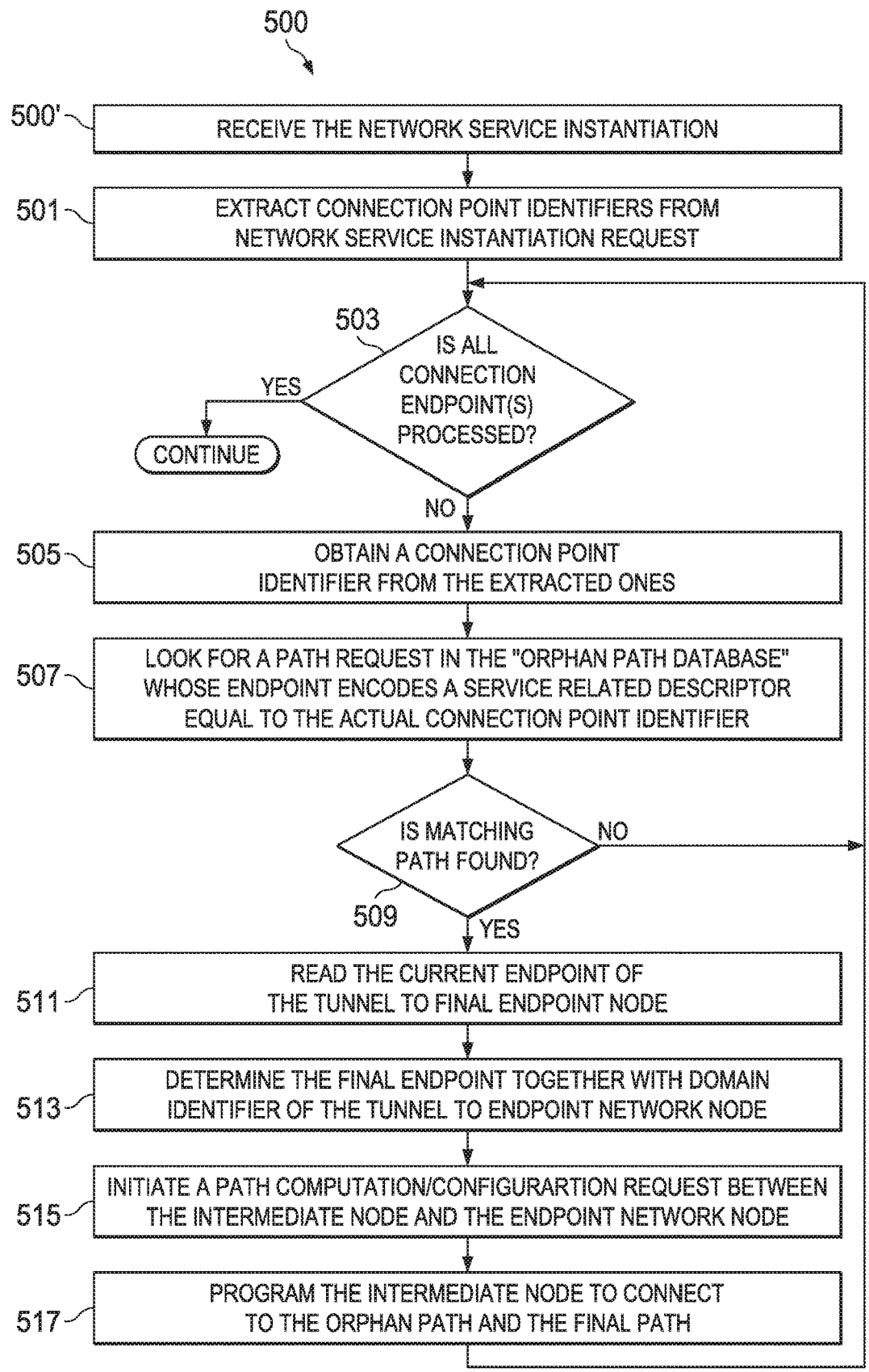
FIG. 5 is a flowchart of a method implemented in the MDO for updating a tunnel configured when executing a network service instantiation in accordance with an embodiment of the present disclosure.

When the MDO 212b, 212c decides to accept the path calculation/instantiation request in step 417, the MDO 212b, 212c at step 419 determines an intermediate node (temporary infrastructure node) where the connection (path) will be terminated (e.g., a data center gateway, $208c_1/208c_2$ or one of the edge nodes, $210c_3/210c_4$—see third scenario and the discussion about the "intermediate node" with respect to the FIG. 5). Thereafter at step 421, the MDO 212b, 212c constructs the endpoint resolution reply 243, 241 indicating the selected endpoint and the domain identifier of the intermediate node. Once the endpoint resolution reply 243, 241 is constructed, the MDO 212b, 212c sends the endpoint resolution reply 243, 241 to the requesting PCE 218b, 218c. Thereafter, the MDO 212b, 212c proceeds to the stop step 425.

MDO Procedures when Receiving a New Service Request 233 (Service Specifications 233)

According to the procedure shown on FIG. 4, the MDO 212b, 212c resolves a tunnel endpoint characterized with a service related descriptor to either an address of an infrastructure node (e.g., MDO 212c in the first scenario) or a second service related descriptor (e.g., MDO 212b in the second scenario). The resolution process expects that MDO 212b, 212c already received a network service instance request 233 (service specifications 233) that is referred in the service related descriptor (e.g., see first scenario's step 1a and second scenario's step 2a). When the MDO 212b, 212c has not received a network service instance request 233 (service specification 233) yet, the MDO 212b, 212c can refuse the path calculation associated with a received endpoint resolution request 225b, 225c (see FIG. 4's step 423). Alternatively, the MDO 212b, 212c when it has not received a network service instance request 233 (service specification 233) can continue with the path calculation associated with a received endpoint resolution request 225b, 225c by selecting a "safe" endpoint ("intermediate node) of the tunnel (see FIG. 4's steps 419 and 421 and the third scenario). Such tunnels are referred to herein as orphan tunnels. It should be appreciated that the MDO 212b, 212c can receive a service request of instantiating such a network service instance that is referred to by one or several orphan tunnels. The MDO 212b, 212c would then update the referrer orphan tunnel in order to fulfill all requirements set with the instantiated network service and generated by the orchestration decisions. Referring to FIG. 5 which is discussed next presents an exemplary method 500 of updating the "orphan" tunnels once the MDO 212b, 212c receives (step 500') the network service instantiation 233 in accordance with an embodiment of the present disclosure.

As part of the procedure the MDO 212b, 212c can implement the following described steps of method 500 in accordance with an embodiment of the present disclosure. At step 501, the MDO 212b, 212c extracts the identifiers of connection endpoint listed in the network service descriptor referred by the network service instantiation request 233 (service specifications 233). Thereafter, the MDO 212b, 212c executes steps 505 to 517 for each extracted identifier as discussed below.

At step 503, the MDO 212b, 212c checks if all connection endpoint identifiers extracted in step 501 were processed. If the result of step 503 is yes, the MDO 212b, 212c completes the method 500 at step 517 and continues with the orchestration procedure according to the state of the art. If the result of step 505 is no, the MDO 212b, 212c continues with step 505 and obtains a connection point identifier from the extracted connection endpoint identifiers that has not been processed yet. At step 507, the MDO 212b, 212c looks for an already processed path computation request whose endpoint is a service related descriptor referring to a not-yet-implemented connection point (or service object in general) and the content of this service related descriptor equals to the connection point identifier (or equals to a representation of the service object in general). At step 509, MDO 212b, 212c checks if it found such a path computation request. If the result of step 509 is no, the MDO 212b, 212c returns to step 503 and continues with processing the next connection point.

When the MDO 212b, 212c finds a matching path computation request during step 509, the MDO 212b, 212c at step 511 reads the current infrastructure endpoint (temporary network node, intermediate node) selected for the tunnel (path). At step 513, the MDO 212b, 212c determines the final endpoint of the tunnel (path), i.e., where the tunnel should be terminated instead of the current identifier at the intermediate node (temporary network node). The final endpoint of the tunnel can be an infrastructure node or a service related descriptor together with identifier of the domain where the service descriptor is to be implemented.

At step 515, the MDO 212b, 212c initiates a path computation and establishment requests to implement a tunnel (path, connection) between the endpoint associated with the intermediate node (temporary network node) and the endpoint associated with the final endpoint network node. The step 515 includes triggering the associated PCE 218b, 218c if needed. The step 515 results in a second tunnel being established. When the setup of this second tunnel fails, for example the QoS requirements associated to the tunnels are violated, the original orphan tunnel shall be also disconnected.

At step 517, the MDO 212b, 212c programs the intermediate network node (temporary network node) to connect the orphan tunnel (path) of the intermediate node with the above instantiated second tunnel (path) with the endpoint network node. In one implementation, the MDO 212b, 212c directly programs the infrastructure node that implements the current endpoint. Finally, the MDO 212b, 212c continues with the method 500 by returning to and implementing step 503. Note 1: the instantiation request 233 considered during this procedure can be a VNF or a Network Service instantiation request. Note 2: the MDO 212b, 212c will wait the outcome of the triggered path computation request prior executing step 517. This behavior makes the orchestration procedure slower if the steps 505 to 517 are executed on the connection points one after other (serialized implementation). Alternatively, a parallelized implementation of the method 500 described above can execute steps 505 to 517 in parallel on all connection points defined in the network service instantiation request 233 (service specifications 233).

Reporting Connection Point Identifier

The PCE 218b, 218c (for example) belonging to the service terminating operator may report back the selected physical tunnel endpoint in its response to the requesting PCE(s) 218a (for example) by rewriting the service reference encoding TLV to an identifier of the selected tunnel endpoints (e.g., a router or interface identifier) in the reply sent to the requesting PCE(s) 218a.

Figure 6:
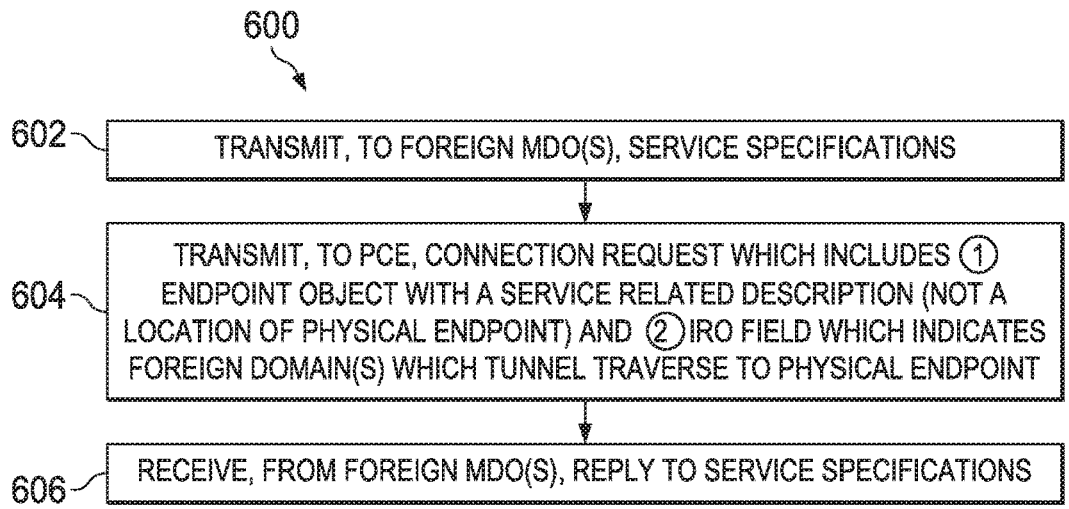
FIG. 6 is a flowchart of a method implemented in the MDO for performing a connection request operation in accordance with an embodiment of the present disclosure.

Functionalities-Configurations of the MDOs 212a, 212b, 212c, and the PCE 218a, 218b, 218c Referring to FIG. 6, there is a flowchart of a method 600 implemented in the MDO 212a (for example) for performing a connection request operation in accordance with an embodiment of the present disclosure. At step 602, the MDO 212a transmits, to one or more foreign MDOs 212b, 212c, service specifications 233 associated with a network service. At step 604, the MDO 212a transmits, to an associated PCE 218a, a connection request 222 to at least calculate a path for a tunnel associated with the network service. The connection request 222 includes (1) an endpoint object 222a which includes a service related description but not an identifier (location) of a physical endpoint associated with the network service, and (2) an IRO field 222b which indicates one or more foreign domains through which the tunnel will traverse to the physical endpoint. At step 606, the MDO 212*a* receives, from the one or more foreign MDOs 212*b*, 212*c*, a reply 235 indicating receipt of the service specifications 233. It should be appreciated that the MDO 212*a* can perform step 602 after step 604 (e.g., see third scenario). Further it should be appreciated that MDOs 212*b*, 212*c* can also be configured to implement method 600, and that MDO 212*a* can also implement methods 400 and 500 described below with respect to FIGS. 4 and 5.

Figure 7:
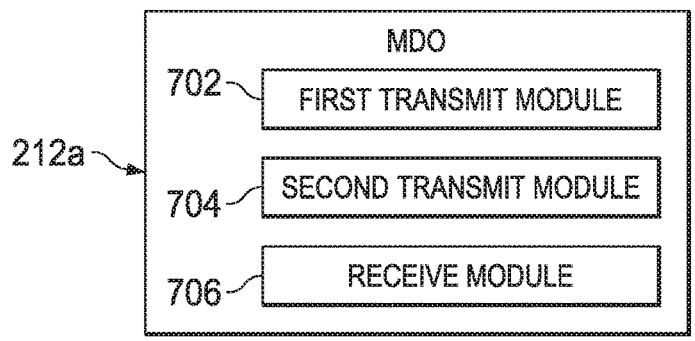
FIG. 7 is a block diagram illustrating a structure of the MDO configured to implement the method shown in FIG. 6 in accordance with an embodiment of the present disclosure.

Referring to FIG. 7, there is a block diagram illustrating structures of the MDO 212*a* which implements method 600 in accordance with an embodiment of the present disclosure. In one embodiment, the MDO 212*a* comprises a first transmit module 702, a second transmit module 704, and a receive module 706. The first transmit module 702 is configured to transmit, to one or more foreign MDOs 212*b*, 212*c*, service specifications 233 associated with a network service. The second transmit module 704 is configured to transmit, to an associated PCE 218*a*, a connection request 222 to at least calculate a path for a tunnel associated with the network service. The connection request 222 includes (1) an endpoint object 222*a* which includes a service related description but not an identifier (location) of a physical endpoint associated with the network service, and (2) an IRO field 222*b* which indicates one or more foreign domains through which the tunnel will traverse to the physical endpoint. The receive module 706 is configured to receive, from the one or more foreign MDOs 212*b*, 212*c*, a reply 235 indicating receipt of the service specifications 233. It should be noted that the MDO 212*a* may also include other components, modules or structures which are well-known, but for clarity, only the components, modules or structures needed to describe the features of the present disclosure are described herein. Further it should be appreciated that MDOs 212*b*, 212*c* can also include modules 702, 704, and 706.

As those skilled in the art will appreciate, the above-described modules 702, 704, and 706 of the MDO 212*a* may be implemented separately as suitable dedicated circuits. Further, the modules 702, 704, and 706 can also be implemented using any number of dedicated circuits through functional combination or separation. In some embodiments, the modules 702, 704, and 706 may be even combined in a single application specific integrated circuit (ASIC). As an alternative software-based implementation, the MDO 212*a* may comprise a memory 708, and a processor 710 (including but not limited to a microprocessor, a microcontroller or a Digital Signal Processor (DSP), etc.), as shown on FIG. 2. The memory 708 stores machine-readable program code executable by the processor 710 to cause the MDO 212*a* to perform the steps of the above-described method 600.

Figure 8:
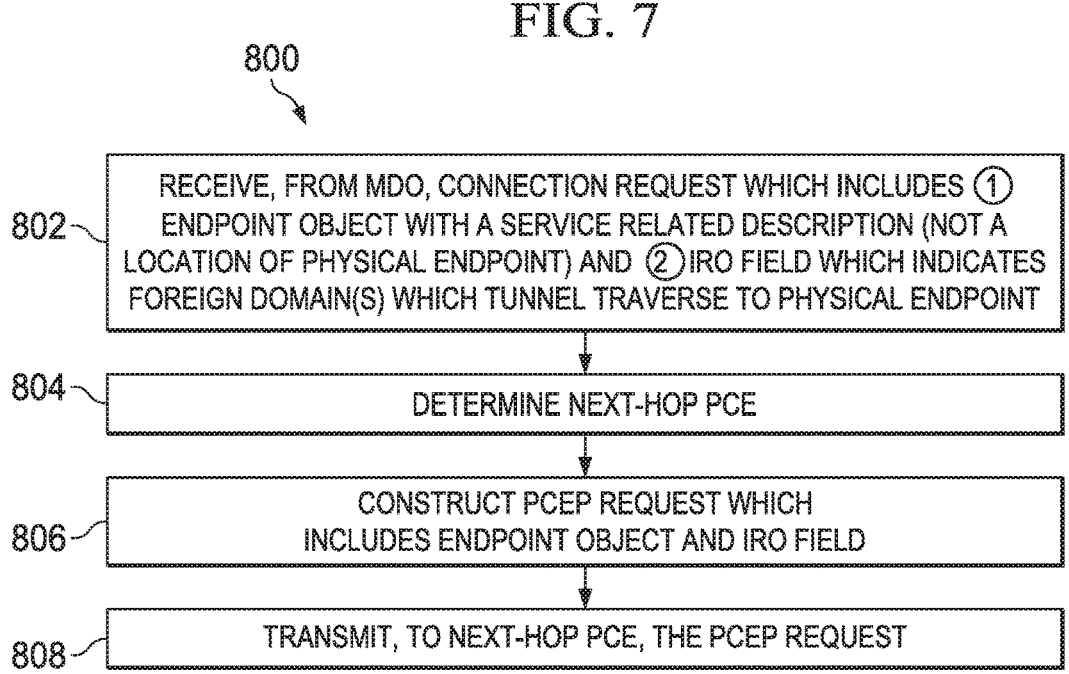
FIG. 8 is a flowchart of a method implemented in the PCE for performing a connection request operation in accordance with an embodiment of the present disclosure.

Referring to FIG. 8, there is a flowchart of a method 800 implemented in the PCE 218*a* (for example) for performing a connection request operation in accordance with an embodiment of the present disclosure. At step 802, the PCE 218*a* receives, from an associated MDO 212*a*, a connection request 222 to at least calculate a path for a tunnel associated with a network service. The connection request 222 includes (1) an endpoint object 222*a* which includes a service related description but not an identifier (location) of a physical endpoint of the network service, and (2) an IRO field 222*b* which indicates one or more foreign domains through which the tunnel will traverse to the physical endpoint. At step 804, the PCE 218*a* determines a next-hop PCE 218*b* (for example) associated with one of the one or more foreign domains. At step 806, the PCE 218*a* constructs a PCEP request 237 which includes the endpoint object 222*a* and the IRO field 222*b* associated with the connection request. At step 808, the PCE 218*a* transmits, to the next-hop PCE 218*b*, the PCEP request 237. It should be appreciated that the PCEs 218*b*, 218*c* can also implement method 800, and that PCE 218*a* can also implement method 300 described above with respect to FIG. 3.

Figure 9:
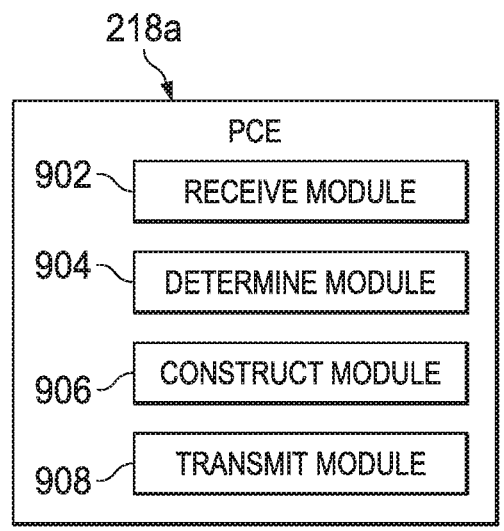
FIG. 9 is a block diagram illustrating a structure of the PCE configured to implement the method shown in FIG. 8 in accordance with an embodiment of the present disclosure.

Referring to FIG. 9, there is a block diagram illustrating structures of the PCE 218*a* which implements method 800 in accordance with an embodiment of the present disclosure. In one embodiment, the PCE 218*a* comprises a receive module 902, a determine module 904, a construct module 906, and a transmit module 908. The receive module 902 is configured to receive, from an associated MDO 212*a*, a connection request 222 to at least calculate a path for a tunnel associated with a network service. The connection request 222 includes (1) an endpoint object 222*a* which includes a service related description but not an identifier (location) of a physical endpoint of the network service, and (2) an IRO field 222*b* which indicates one or more foreign domains through which the tunnel will traverse to the physical endpoint. The determine module 904 is configured to determine a next-hop PCE 218*b* (for example) associated with one of the one or more foreign domains. The construct module 906 is configured to construct a PCEP request 237 which includes the endpoint object 222*a* and the IRO field 222*b* associated with the connection request. The transmit module 908 is configured to transmit, to the next-hop PCE 218*b*, the PCEP request 237. It should be noted that the PCE 218*a* may also include other components, modules or structures which are well-known, but for clarity, only the components, modules or structures needed to describe the features of the present disclosure are described herein. Further it should be appreciated that PCEs 218*b*, 218*c* can also include modules 902, 904, 906, and 908.

As those skilled in the art will appreciate, the above-described modules 902, 904, 906, and 908 of the PCE 218*a* may be implemented separately as suitable dedicated circuits. Further, the modules 902, 904, 906, and 908 can also be implemented using any number of dedicated circuits through functional combination or separation. In some embodiments, the modules 902, 904, 906, and 908 may be even combined in a single application specific integrated circuit (ASIC). As an alternative software-based implementation, the PCE 218*a* may comprise a memory 910, and a processor 912 (including but not limited to a microprocessor, a microcontroller or a Digital Signal Processor (DSP), etc.), as shown on FIG. 2. The memory 910 stores machine-readable program code executable by the processor 912 to cause the PCE 218*a* to perform the steps of the above-described method 800.

Figure 10:
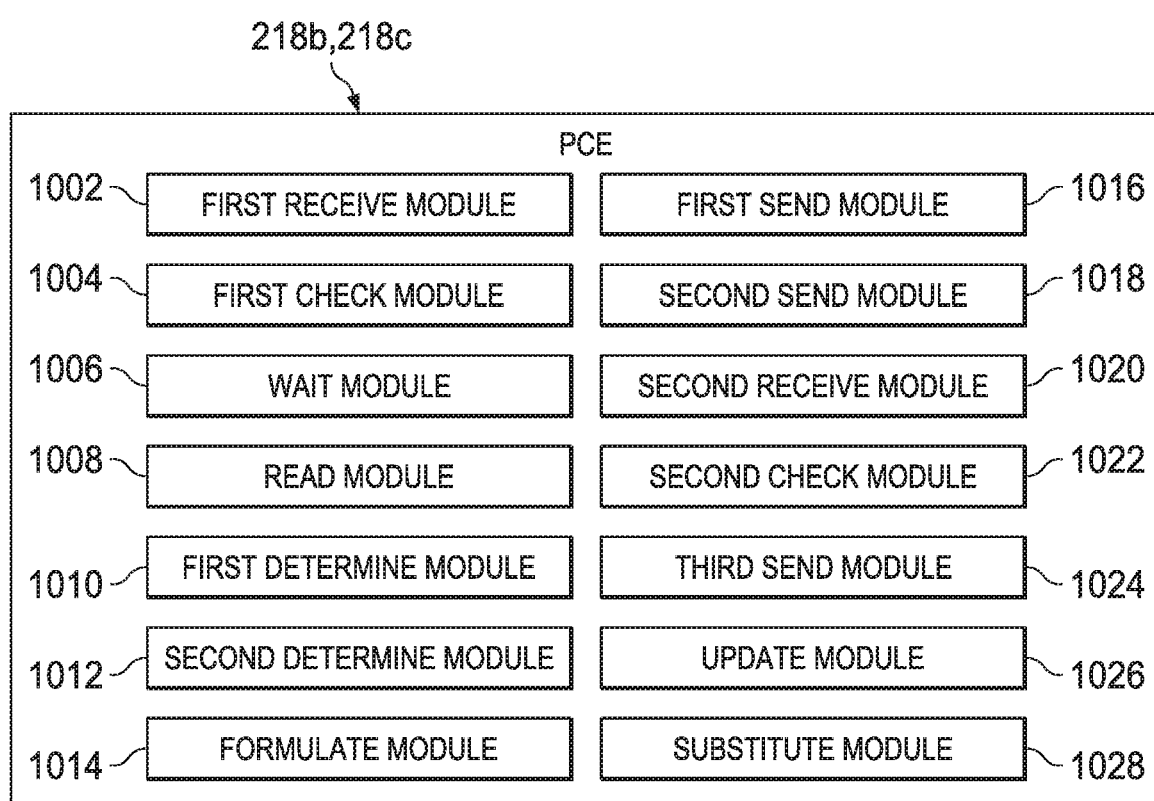
FIG. 10 is a block diagram illustrating a structure of the PCE configured to implement the method shown in FIG. 3 in accordance with an embodiment of the present disclosure; and, FIG. 11 is a block diagram illustrating a structure of the MDO configured to implement the methods shown in FIGS. 4-5 in accordance with an embodiment of the present disclosure.

Referring to FIG. 10, there is a block diagram illustrating structures of the PCE 218*b*, 218*c* which implements method 300 in accordance with an embodiment of the present disclosure. In one embodiment, the PCE 218*b*, 218*c* comprises a first receive module 1002, a first check module 1004, a wait module 1006, a read module 1008, a first determine module 1010, a second determine module 1012, a formulate module 1014, a first send module 1016, a second send module 1018, a second receive module 1020, a second check module 1022, a third send module 1024, an update module 1026, and a substitute module 1028. The first receive module 1002 is configured to receive, from a foreign PCE 218*a*, a PCEP request 237, 239, 244 to at least calculate a path for a tunnel associated with a network service (see FIG. 3's step 300'). The PCEP request 237, 239, 244 includes (1)

an endpoint object 222a which includes a service related description but not an identifier (location) of a physical endpoint of the network service, and (2) an IRO field 222b which indicates one or more domains through which the tunnel will traverse to the physical endpoint. The first check module 1004 is configured to check the PCEP request 237, 239, 244 to determine whether a destination for the tunnel (connection) associated with the network service is encoded in a form of the service related descriptor (see FIG. 3's step 301). Based on the determination that the destination for the tunnel associated with the network service is not encoded in a form of the service related descriptor, the wait module 1006 is configured to wait for the receipt of the next PCEP request (see FIG. 3's step 319). Based on the determination that the destination for the tunnel associated with the network service is encoded in a form of the service related descriptor, the read module 1008 is configured to read the IRO field 222b (see FIG. 3's step 305). The determine module 1010 is configured to determine whether all of the one or more domains are under control of an associated MDO 212b, 212c (see FIG. 3's step 307). Based on the determination that all of the one or more domains are not under control of the associated MDO 212b, 212c, the second determine module 1012 is configured to determine a next-hop PCE associated with one of the one or more domains (see FIG. 3's step 306a). The formulate module 1014 is configured to formulate a subsequent PCEP request (which includes the endpoint object and the IRO field) to at least calculate the path for the tunnel associated with the network service (see FIG. 3's step 306b). The first send module 1016 is configured to send the subsequent PCEP request to the next-hop PCE (e.g., see the first scenario) (see FIG. 3's step 306c). Based on the determination that all of the one or more domains are under control of the associated MDO 212b, 212c, the second send module 1018 is configured to send, to the associated MDO 212b, 212c, an endpoint resolution request 225b, 225c (see FIG. 3's step 307). The second receive module 1020 is configured to receive, from the associated MDO 212b, 212c, an endpoint resolution reply 241, 243 (see FIG. 3's step 309). The second check module 1022 is configured to check whether the endpoint resolution reply 241, 243 contains a valid endpoint and a domain set is either empty or defines valid identifiers to domains (see FIG. 3's step 311). Based on the determination that the endpoint resolution reply 241, 243 failed to contain the valid endpoint and the domain set is either empty or defines valid identifiers to domains, the third send module 1024 is configured to send a reply indicating that the PCEP request had failed to the foreign PCE 218a (see FIG. 3's step 313). Based on the determination that the endpoint resolution reply did contain the valid endpoint and the domain set is either empty or defines valid identifiers to domains, the update module 1026 is configured to update the service related descriptor with the physical endpoint provided by the associated MDO 218b, 218c (see FIG. 3's step 315). The substitute module 1028 is configured to substitute a sub-object in the IRO field 222b that specified the domain of the physical endpoint in the incoming PCEP request 237, 239, 244 with a sequence of IRO sub-objects that describe the domain set in the endpoint resolution reply 241, 243 provided by the associated MDO 212b, 212c (see FIG. 3's step 317). It should be noted that the PCE 218b, 218c may also include other components, modules or structures which are well-known, but for clarity, only the components, modules or structures needed to describe the features of the present disclosure are described herein. Further it should be appreciated that PCE 218a can also perform method 300 and include modules 1002, 1004, 1006, 1008, 1010, 1012, 1014, 1016, 1018, 1020, 1022, 1024, 1026, and 1028.

As those skilled in the art will appreciate, the above-described modules 1002, 1004, 1006, 1008, 1010, 1012, 1014, 1016, 1018, 1020, 1022, 1024, 1026, and 1028 of the PCE 218b, 218c may be implemented separately as suitable dedicated circuits. Further, the modules 1002, 1004, 1006, 1008, 1010, 1012, 1014, 1016, 1018, 1020, 1022, 1024, 1026, and 1028 can also be implemented using any number of dedicated circuits through functional combination or separation. In some embodiments, the modules 1002, 1004, 1006, 1008, 1010, 1012, 1014, 1016, 1018, 1020, 1022, 1024, 1026, and 1028 may be even combined in a single application specific integrated circuit (ASIC). As an alternative software-based implementation, the PCE 218b, 218c may comprise a memory 1030, and a processor 1032 (including but not limited to a microprocessor, a microcontroller or a Digital Signal Processor (DSP), etc.) as shown in FIG. 2. The memory 1030 stores machine-readable program code executable by the processor 1032 to cause the PCE 218b, 218c to perform the steps of the above-described method 300.

Figure 11:
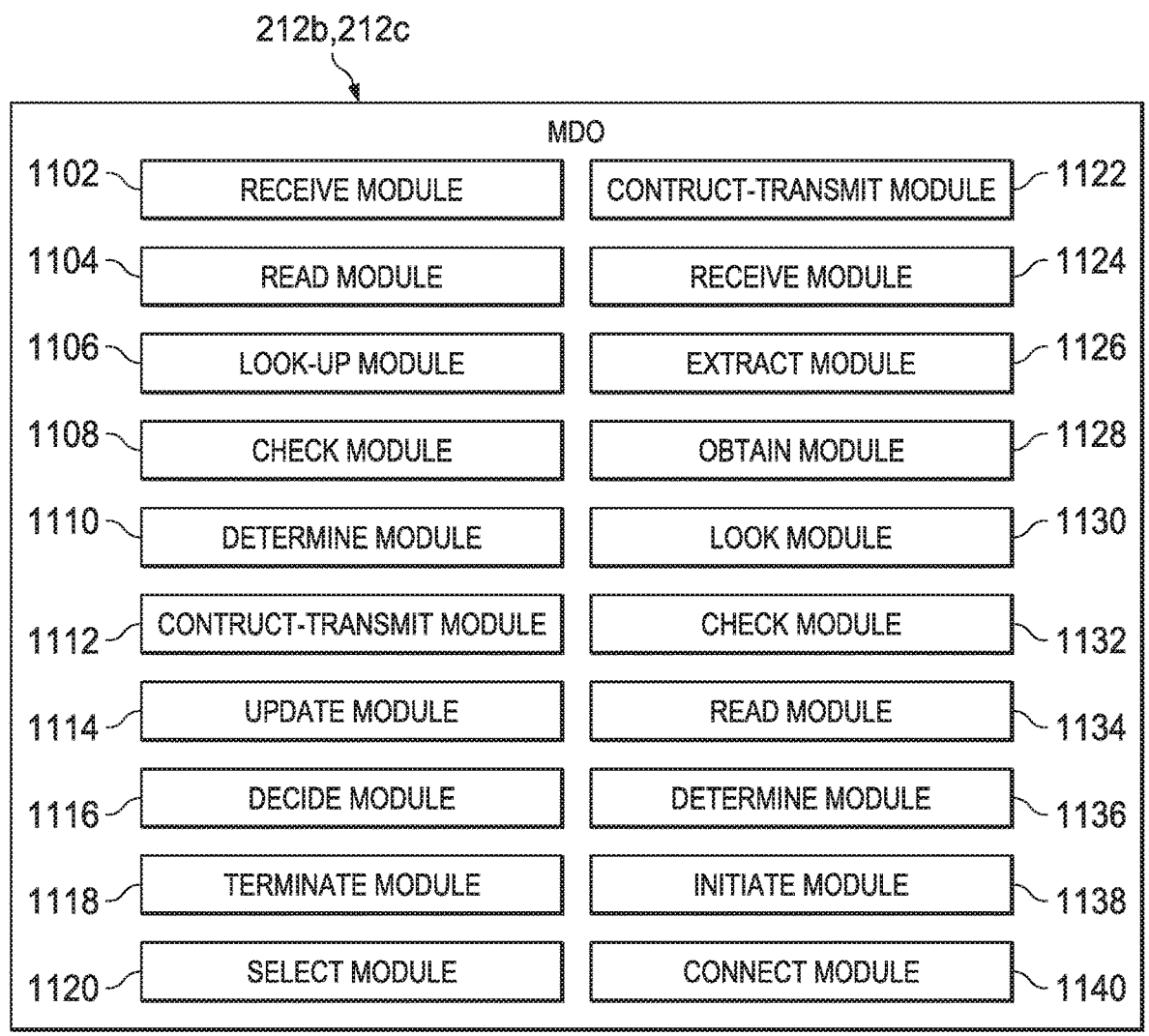

Referring to FIG. 11, there is a block diagram illustrating structures of the MDO 212b, 212c which implements methods 400 and 500 in accordance with an embodiment of the present disclosure. In one embodiment, the MDO 212b, 212c comprises a receive module 1102, a read module 1104, a look-up module 1106, a check module 1108, a determine module 1110, a construct-transmit module 1112, an update module 1114, a decide module 1116, a terminate module 1118, a select module 1120, a construct-transmit module 1122, a receive module 1124, an extract module 1126, an obtain module 1128, a look module 1130, a check module 1132, a read module 1134, a determine module 1136, an initiate module 1138, and a connect module 1140. The receive module 1102 is configured to receive, from an associated PCE 218b, 218c, an endpoint resolution request 225a, 225b (see FIG. 4's step 400'). The endpoint resolution request 225a, 225b includes (1) an endpoint object 222a which includes a service related description but not an identifier (location) of a physical endpoint of a network service, and (2) an IRO field 222b which indicates on one or more domains through which a tunnel will traverse to the physical endpoint. The read module 1104 is configured to read the service related descriptor from the endpoint object of the endpoint resolution request (see FIG. 4's step 401). The look-up module 1106 is configured to look-up a service instance that contains a service element referred to by the service related descriptor (see FIG. 4's step 403). The check module 1108 is configured to check whether there is a service that contains the service element referred by the service related descriptor (see FIG. 4's step 405). Based on the determination that there is the service that contains the service element referred by the service related descriptor, the determine module 1110 is configured to determine an endpoint identifier or another service related descriptor where the physical endpoint resides (see FIG. 4's step 407). The construct-transmit module 1112 is configured to construct an endpoint resolution reply 241, 243 including the determined endpoint identifier or another service related descriptor and transmit the endpoint resolution reply 241, 243 to the PCE 218b, 218c (see FIG. 4's step 411). The update module 1114 is configured to update a service instance configuration to use the tunnel to the physical endpoint (see FIG. 4's step 415). Based on the determination that there is no service that contains the service element referred by the service related descriptor, the decide module 1116 is configured to decide whether to accept a path calculation request associated with the endpoint resolution request 225a, 225b while expecting that a network service instantiation request 233 that carries the referred service element will be received (see FIG. 4's step 417). Based on the determination that will not accept the path calculation request, the terminate module 1118 is configured to terminate the tunnel request and send a no-path indication to the associated PCE 218b, 218c (see FIG. 4's step 423). Based on the determination that will accept the path calculation request, the select module 1120 is configured to select an intermediate network node (temporary infrastructure node) where a first path for the network service will be terminated (see FIG. 4's step 419). The construct-transmit module 1122 is configured to construct an endpoint resolution reply 241, 243 indicating a selected endpoint and a domain identifier of the intermediate network node and transmit the endpoint resolution reply 241, 243 to the associated PCE 218b, 218c (see FIG. 4's step 421). The receive module 1124 is configured to receive the network service instantiation request 233 (see FIG. 5's step 500'). The extract module 1126 is configured to extract identifiers of connection endpoint points listed in the network service descriptor referred by the network service instantiation request 233 (see FIG. 5's step 501). The obtain module 1128 is configured to obtain a connection point identifier from the extracted connection endpoint identifiers that has not been processed yet (see FIG. 5's step 505). The look module 1130 is configured to look for an already processed path computation request within an orphan path database whose endpoint is a service related descriptor referring to a not-yet-implemented connection point and a content of this service related descriptor equals an actual connection point identifier (see FIG. 5's step 507). The check module 1132 is configured to check whether a matching path computation request is found (see FIG. 5's step 509). Based on the determination that the matching path computation request has been found, the following modules 1134, 1136, 1138 and 1140 would be configured to: read the intermediate network node selected for the second path (see read module 1134 and FIG. 5's step 511); determine a final endpoint of the second path to the endpoint network node (see determine module 1136 and FIG. 5's step 513); initiate a path computation and establishment requests to implement the second path between the intermediate network node and the endpoint network node (see initiate module 1138 and FIG. 5's step 515); and program the intermediate network node to connect the first path with the intermediate network node to the second path with the final endpoint network node (see connect module 1140 and FIG. 5's step 517). It should be noted that the MDO 212b, 212c may also include other components, modules or structures which are well-known, but for clarity, only the components, modules or structures needed to describe the features of the present disclosure are described herein. Further it should be appreciated that MDO 212a can also include modules 1102, 1104, 1106, 1108, 1110, 1112, 1114, 1116, 1118, 1120, 1122, 1124, 1126, 1128, 1130, 1132, and 1134.

As those skilled in the art will appreciate, the above-described modules 1102, 1104, 1106, 1108, 1110, 1112, 1114, 1116, 1118, 1120, 1122, 1124, 1126, 1128, 1130, 1132, and 1134 of the MDO 212ab, 212c may be implemented separately as suitable dedicated circuits. Further, the modules 1102, 1104, 1106, 1108, 1110, 1112, 1114, 1116, 1118, 1120, 1122, 1124, 1126, 1128, 1130, 1132, and 1134 can also be implemented using any number of dedicated circuits through functional combination or separation. In some embodiments, the modules 1102, 1104, 1106, 1108, 1110, 1112, 1114, 1116, 1118, 1120, 1122, 1124, 1126, 1128, 1130, 1132, and 1134 may be even combined in a single application specific integrated circuit (ASIC). As an alternative software-based implementation, the MDO 212b, 212c may comprise a memory 1136, and a processor 1138 (including but not limited to a microprocessor, a microcontroller or a Digital Signal Processor (DSP), etc.) as shown in FIG. 2. The memory 1136 stores machine-readable program code executable by the processor 1138 to cause the MDO 212b, 212c to perform the steps of the above-described methods 400 and 500.

In view of the foregoing, one skilled in the art will appreciate that a feature of the present disclosure is to use service related descriptor(s) to characterize path endpoint(s) that are not bound to resource(s) in advance in PCE connection requests and PCEP requests. As described herein, after originating a network service orchestration request, a MDO 212a (for example) sends a connection request 222 to a PCE 218a (for example) to calculate a path for a connection between a set of endpoints where the MDO 212a uses references to element(s) of the requested network service to characterize the endpoint(s) instead of defining an infrastructure element (e.g., an IP address of a router). The PCE 218a (for example) upon receiving the request 222 will send a PCEP request 237 (for example) to the next-hop PCE 218b (for example) which checks if any of the endpoints described in the PCEP request's endpoint object 222a carries a descriptor that is not bound to resources. If yes, the PCE 218b sends an endpoint resolution request 225b (for example) to the MDO 212b (for example). The MDO 212b resolves the descriptor and provides an identifier of an infrastructure network element (e.g., a router, a gateway, a blade server) or a second descriptor together with an identifier of the operator that implements the service element (note: the descriptor can refer to elements of a network service specification) to the PCE 218b. The MDO 212b (for example) may also trigger further path computation requests to setup additional connections needed for implementing the requested service. The MDO 212b (for example) may also update the service instance to make use of the established connections.

The exemplary network infrastructure 200 and components associated therewith has many advantages some of which are as follows (for example):

The tunnel terminating operator (e.g., operator B, C) becomes able to select the most suitable termination router of a service without disclosing it to the service originating operator (e.g., operator A). For example, the tunnel terminating operator may hide the supported interworking options between its data center and WAN and between its WANs (see operator C in FIG. 2). However, the tunnel terminating operator wants to terminate tunnels at the data center gateway to carry services requiring VRFs at the gateway while it would create end-to-end tunnels directly to the blade server within the data center for services having stringent delay requirements. By applying the procedure of the present disclosure, the tunnel terminating MDO, based on its own decision, can select the appropriate tunnel endpoints and report this selection to its corresponding PCE.

The tunnel terminating operator (e.g., operator B, C) does not need to reveal the identifier (location) of a service endpoint regardless of the level of aggregation of reported networking resources. For example, the tunnel terminating operator advertises a topology view where the data centers are represented as one common domain. When the tunnel terminating MDO 212b, 212c selects one of the data centers to implement the network function, the service originating operator does not need to know where that network function is instantiated.

The tunnel terminating operator (e.g., operator B, C) becomes able to relocate the endpoint of the implemented connection locally, as long as the exchange point remains the same.

The tunnel terminating operator (e.g., operator B, C) becomes able to hide some aspects of its internal structure of its network from the service originating operator without compromising the optimality of service implementation.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A Multi-Domain Orchestrator (MDO) comprising:
a processor; and,
a memory that stores processor-executable instructions, wherein the processor interfaces with the memory to execute the processor-executable instructions, whereby the MDO is operable to:
transmit, to one or more foreign MDOs, service specifications associated with a network service; and;
transmit, to an associated Path Computation Entity (PCE), a connection request to at least calculate a path for a tunnel associated with the network service, wherein the connection request includes (1) an endpoint object which includes a service related description but not an identifier of a physical endpoint associated with the network service, and (2) an Include Route Object (IRO) field which indicates one or more foreign domains through which the tunnel will traverse to the physical endpoint, wherein the MDO by transmitting the connection request enables a tunnel terminating operator to select a termination router of the network service without disclosing the selected termination router to the MDO.

2. The MDO of claim 1, wherein the service related description is encoded in a Type Length Value (TLV) located within the endpoint object of the connection request.

3. A Path Computation Entity (PCE) comprising:
a processor; and,
a memory that stores processor-executable instructions, wherein the processor interfaces with the memory to execute the processor-executable instructions, whereby the PCE is operable to:
receive, from an associated Multi-Domain Orchestrator (MDO), a connection request to at least calculate a path for a tunnel associated with a network service, wherein the connection request includes (1) an endpoint object which includes a service related description but not an identifier of a physical endpoint of the network service, and (2) an Include Route Object (IRO) field which indicates one or more foreign domains through which the tunnel will traverse to the physical endpoint, wherein the MDO by transmitting the connection request enables a tunnel terminating operator to select a termination router of the network service without disclosing the selected termination router to the MDO;
determine a next-hop PCE associated with one of the one or more foreign domains;
construct a Path Computation Element Protocol (PCEP) request which includes the endpoint object and the IRO field associated with the connection request; and,
transmit, to the next-hop PCE, the PCEP request.

4. The PCE of claim 3, wherein the PCE is further operable to perform the construct operation by encoding one or more additional attributes received in the connection request into the PCEP request.

5. The PCE of claim 3, wherein the service related description is encoded in a Type Length Value (TLV) within the endpoint object of the PCEP request.

6. A Path Computation Entity (PCE) comprising:
a processor; and,
a memory that stores processor-executable instructions, wherein the processor interfaces with the memory to execute the processor-executable instructions, whereby the PCE is operable to:
receive, from a foreign PCE, a Path Computation Element Protocol (PCEP) request to at least calculate a path for a tunnel associated with a network service, wherein the PCEP request includes (1) an endpoint object which includes a service related description but not an identifier of a physical endpoint of the network service, and (2) an Include Route Object (IRO) field which indicates one or more domains through which the tunnel will traverse to the physical endpoint;

check the PCEP request to determine whether a destination for the tunnel associated with the network service is encoded in a form of the service related descriptor;

based on the determination that the destination for the tunnel associated with the network service is encoded in a form of the service related descriptor, read the IRO field and determine whether all of the one or more domains are under control of an associated Multi-Domain Orchestrator (MDO); and, based on the determination that all of the one or more domains are not under control of the associated MDO, determine a next-hop PCE associated with one of the one or more domains, formulate a subsequent PCEP request to at least calculate the path for the tunnel associated with the network service, wherein the subsequent PCEP request includes (1) the endpoint object which includes the service related description but not the identifier of the physical endpoint of the network service, and (2) the IRO field which has been updated and indicates the one or more domains through which the tunnel will traverse to the physical endpoint, and send the subsequent PCEP request to the next-hop PCE.

7. The PCE of claim 6, wherein the PCE based on the determination that all of the one or more domains are under control of the associated MDO is further operable to:

send, to the associated MDO, an endpoint resolution request;

receive, from the associated MDO, an endpoint resolution reply;

check whether the endpoint resolution reply contains a valid endpoint and a domain set is either empty or defines valid identifiers to domains;

based on the determination that the endpoint resolution reply failed to contain the valid endpoint and the domain set is either empty or defines valid identifiers to domains, send a reply indicating that the PCEP request had failed to the foreign PCE; and, based on the determination that the endpoint resolution reply did contain the valid endpoint and the domain set is either empty or defines valid identifiers to domains, update the service related descriptor with the physical endpoint identifier provided by the associated MDO, and substitute a sub-object in the IRO field that specified the domain of the physical endpoint in the incoming PCEP request with a sequence of IRO sub-objects that describe the domain set in the endpoint resolution reply provided by the associated MDO.

8. A Multi-Domain Orchestrator (MDO) comprising:
a processor; and,
a memory that stores processor-executable instructions, wherein the processor interfaces with the memory to execute the processor-executable instructions, whereby the MDO is operable to:

receive, from an associated Path Computation Entity (PCE), an endpoint resolution request, wherein the endpoint resolution request includes (1) an endpoint object which includes a service related description but not an identifier of a physical endpoint of a network service, and (2) an Include Route Object (IRO) field which indicates on one or more domains through which a tunnel will traverse to the physical endpoint;

read the service related descriptor from the endpoint object of the endpoint resolution request;

look-up a service instance that contains a service element referred to by the service related descriptor;

check whether there is a service that contains the service element referred by the service related descriptor;

based on the determination that there is the service that contains the service element referred by the service related descriptor, determine a physical endpoint identifier or another service related descriptor where the physical endpoint resides, construct an endpoint resolution reply including the determined physical endpoint identifier or the another service related descriptor and transmit the endpoint resolution reply to the PCE, and update a service instance configuration to use the tunnel to the physical endpoint.

9. The MDO of claim 8, wherein the MDO based on the determination that there is no service that contains the service element referred by the service related descriptor is further operable to:

decide whether to accept a path calculation request associated with the endpoint resolution request while expecting that a network service instantiation request that carries the referred service element will be received;

based on the determination that will not accept the path calculation request, terminate the tunnel request and send a no-path indication to the associated PCE;

based on the determination that will accept the path calculation request, select an intermediate node where a first path for the network service will be terminated, construct an endpoint resolution reply indicating a selected endpoint and a domain identifier of the intermediate node and transmit the endpoint resolution reply to the associated PCE.

10. The MDO of claim 9, wherein the MDO that was operable to select the intermediate node, construct the endpoint resolution reply, and transmit the endpoint resolution reply to the associated PCE is upon receipt of the network service instantiation request further operable to: determine an physical endpoint, request the associated PCE to create a second path between the intermediate node and the physical endpoint, and configure the intermediate node to connect together the first path and the second path.

11. The MDO of claim 10, wherein the MDO the is operable to determine the endpoint network node, request the associated PCE to create the second path between the intermediate node and the physical endpoint, and configure the intermediate node to connect together the first path and the second path as follows:

extract identifiers of connection endpoint points listed in the network service descriptor referred by the network service instantiation request;

obtain a connection point identifier from the extracted connection endpoint identifiers that has not been processed yet;

look for an already processed path computation request within an orphan path database whose endpoint is a service related descriptor referring to a not-yet-implemented connection point and a content of this service related descriptor equals an actual connection point identifier;

check whether a matching path computation request is found;

based on the determination that the matching path computation request has been found, perform following operations:

read the intermediate network node for the second path;

determine a final endpoint of the second path to the physical endpoint;
initiate a path computation and establishment requests to implement the second path between the intermediate node and the physical endpoint; and,
program the intermediate node to connect the first path and the second path.

\* \* \* \* \*